US006229583B1

(12) United States Patent
Yasunishi

(10) Patent No.: US 6,229,583 B1
(45) Date of Patent: May 8, 2001

(54) LIQUID CRYSTAL DISPLAY DEVICE AND METHOD FOR DRIVING THE SAME

(75) Inventor: Norio Yasunishi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/592,545

(22) Filed: Jun. 12, 2000

Related U.S. Application Data

(62) Division of application No. 08/825,031, filed on Mar. 26, 1997, now Pat. No. 6,094,243.

(30) Foreign Application Priority Data

Mar. 26, 1996 (JP) .................................................. 8-070785
Jan. 14, 1997 (JP) .................................................. 9-005110

(51) Int. Cl.[7] ............................. G02F 1/133; G09G 3/36
(52) U.S. Cl. ............................................... 349/33; 345/89
(58) Field of Search ......................... 349/33, 85; 345/89, 345/98, 99, 100, 147, 148

(56) References Cited

U.S. PATENT DOCUMENTS 5,459,495 10/1995 Scheffer et al. ..................... 345/147
5,548,302 8/1996 Kuwata et al. ........................ 345/89
5,724,058 3/1998 Choi et al. ............................ 345/89
5,818,419 10/1998 Tajima et al. ........................ 345/147
5,870,070 2/1999 Furukawa et al. ..................... 345/99

FOREIGN PATENT DOCUMENTS 0612184 8/1994 (EP) .
52-76897 6/1977 (JP) .
6301359 2/1993 (JP) .
0689082 3/1994 (JP) .
6138854 5/1994 (JP) .
6230752 8/1994 (JP) .

OTHER PUBLICATIONS

T.J. Scheffer et al.; "Active Addressing Method for High-Contrast Video–Rate STN Displays"; SID 92 Digest, 1992; pp. 228–231, No Date Provided.

Ruckmongathan et al.; "A New Addressing Technique for Fast Responding STN LCDs"; Japan Display '92; pp. 65–67, No Date Provided.

*Primary Examiner*—Kenneth Parker
*Assistant Examiner*—Tai V. Duong

(57) ABSTRACT

A liquid crystal display device including a liquid crystal panel is disclosed. The liquid crystal display device includes: a display data transformer for receiving input image data for one frame, for dividing a selection period for each row electrode in the frame into subframes of a number equal to or greater than a number of gray-scale bits representing a gray-scale level of the input image data, the scanning signal being applied to the row electrode during the corresponding selection period, and for generating binary display data in which respective binary data is associated with each subframe according to the gray-scale bits. The Liquid crystal display device further includes a pulse width controller for controlling the division of the selection period in the display data transformer and for setting a respective subframe period independently for each subframe; and a pulse amplitude controller for transforming the binary display data by setting a respective voltage amplitude independently for each subframe according to the binary display data so as to generate a display signal having a respective voltage value set independently for each subframe.

6 Claims, 18 Drawing Sheets

PRIOR ART

LIQUID CRYSTAL DISPLAY DEVICE AND METHOD FOR DRIVING THE SAME

This application is a divisional of co-pending application Ser. No. 08/825,031, filed on Mar. 26, 1997, U.S. Pat. No. 6,094,243, the entire contents of which are hereby incorporated by reference.

BACKGROUND OF THE INVENTION

1. Field of the Invention

The present invention relates to a liquid crystal display device and a method for driving a liquid crystal display device. In particular, the present invention relates to a circuit and a method for driving a matrix-type liquid crystal display device capable of conducting a gray-scale display for use in various office automation apparatuses such as personal computers, word processors and the like, multimedia terminals, video game machines, audio visual apparatuses, etc.

2. Description of the Related Art

Conventionally, a line-sequential scanning method has been employed for driving a simple matrix type liquid crystal display device which employs a liquid crystal material responsive to an effective voltage such as a TN (Twisted Nematic) liquid crystal material or an STN (Super Twisted Nematic) liquid crystal material. According to this method, scanning signals are successively applied to row electrodes as scanning lines so that one row electrode is selected at a time. In synchronization with this selection of one row electrode, signals according to image data for pixels on the selected row electrode are applied to column electrodes as data lines.

Recently, with a growing trend toward multimedia apparatuses, fast-responding STN liquid crystal materials have been improved. Along with this development, it has become possible to realize a motion picture display using the STN liquid crystal material, and color liquid crystal displays have been realized. With these achievements, there is a growing demand for realizing a multi-color display with the STN liquid crystal material for displaying Television images, images for amusement purposes, and the like.

However, in a fast-responding liquid crystal display device utilizing the conventional line-sequential driving method, as the number of scanning lines of the liquid crystal panel increases, the frame response effect becomes greater, thereby lowering the contrast of the display. A way to reduce this deterioration of display quality is to drive a liquid crystal display device with a higher frame frequency. Recently, there have been proposed other driving methods such as the following two methods which can reduce the frame response effect more effectively.

One of the two methods is to select all the row electrodes included in the display panel simultaneously. This is called an active addressing method (see T. J. Scheffer et al.: "Active Addressing Method for High-Contrast Video-Rate STN Displays", SID '92 DIGEST, pages 228 to 231).

The other method is to divide the row electrodes included in the display panel into blocks and select a block of row electrodes at a time. This is called a multiple line selection method (see T. N. Ruckmongathan et al.: "A New Addressing Technique for Fast Responding STN LCDS", JAPAN DISPLAY '92, p65).

The basic display principle of these two methods is to perform an orthogonal transformation for image data based on an orthogonal matrix such as Hadamard's matrix or Walsh's matrix, thereafter performing an inverse transformation for the transformed image data on a liquid crystal panel. Driving signals have waveforms such that some or all of the row electrodes are selected simultaneously in a single-frame period. These two driving methods utilize the cumulative response effect of the liquid crystal material, where a plurality of relatively small scanning selection pulses are applied to a row electrode instead of a single large pulse in a single-frame period, thereby maintaining both the high response rate and the high contrast of the display.

As a method for conducting a gray-scale display with a display device based on the line-sequential driving method, a frame modulation method or a pulse width modulation method is widely employed. In these methods, the amplitude of driving voltages is fixed while the duration of voltage application is varied.

According to the frame modulation method, either one of fixed voltages (ON and OFF display voltages) is selectively applied to a pixel for each frame according to the gray-scale level to be effected on the pixel for the frame. Thus, more than one gray-scale levels are obtained for each pixel as an average state over a plurality of frames. The gray-scale level of a pixel is based on the number of frames during which the ON display voltage is applied to the pixel among the averaging frames.

According to the pulse width modulation method, the amplitude of applied voltages is also fixed (i.e., the ON and OFF display voltages are fixed). However, the pulse width of a signal to be applied to each pixel is modulated based on the gray-scale level to be effected on the pixel so as to obtain a plurality of levels of the gray-scale display.

The frame modulation method or the pulse width modulation method may be employed for a display device using the multiple line selection method or the active addressing method, as well as for the display device using the line-sequential driving method. However, there has also been proposed an amplitude modulation method as a new gray-scale display method for the multiple line selection display devices or the active addressing display devices. According to the amplitude modulation method, the amplitude of an applied voltage is modulated while the duration of voltage application is fixed, so that a gray-scale display with more than one levels is conducted. This method is described in, for example, Japanese Laid-Open Patent Publication No. 6-89082 and Japanese Laid-Open Patent Publication No. 6-138854.

These conventional gray-scale display methods have disadvantages as follows. First, regarding the frame modulation method, in order to effect a certain number of gray-scale levels with this method, a number (the number of gray-scale levels −1) of frames are required. Therefore, as the number of gray-scale levels increases, the number of frames used to effect gray-scale display increases, whereby flickers or wavings in the displayed images may become visible. Moreover, such an undesirable phenomenon becomes more conspicuous when this modulation method is employed in a fast-responding liquid crystal panel.

Next, regarding the pulse width modulation method, in order to effect a certain number of gray-scale levels with this method, the ratio of the minimum and maximum pulse widths must be set to the number of grayscale levels. Accordingly, as the number of gray-scale levels increases, the minimum pulse width decreases. Moreover, as the liquid crystal panel becomes larger, the electrode resistance increases. Therefore, particularly when conducting a gray-scale display on a large liquid crystal panel, waveform distortion of a driving voltage signal becomes large at locations remote from the driving point due to the reduced pulse width and the increased resistance. This allows the non-uniformity of the display to occur more easily. Regarding the amplitude modulation method, in order to obtain voltage amplitudes corresponding to the gray-scale display data, the method requires a complicated large-scale arithmetic circuit for performing square-sum calculation and square-root extraction, and a high-precision liquid crystal driver which outputs a signal having the analog voltage amplitude. These additional circuits result in a large-scale circuit in the display device, and increases the amount of power consumption and the manufacturing cost of the device.

SUMMARY OF THE INVENTION

According to one aspect of this invention, a liquid crystal display device including a liquid crystal panel is provided. The panel includes: a plurality of row electrodes to which scanning signals are applied; a plurality of column electrodes arranged so as to cross the plurality of row electrodes to which display signals are applied; and a liquid crystal layer interposed between the row electrodes and the column electrodes for displaying images in response to a value of an effective voltage applied between the row electrode and the column electrode at intersections of the row electrodes and the column electrodes. The device includes: a display data transformer for receiving input image data for one frame, for dividing a selection period for each row electrode in the frame into subframes of a number equal to or greater than a number of gray-scale bits representing a grayscale level of the input image data, the scanning signal being applied to the row electrode during the corresponding selection period, and for generating binary display data in which respective binary data is associated with each subframe according to the gray-scale bits; a pulse width controller for controlling the division of the selection period in the display data transformer and for setting a respective subframe period independently for each subframe; and a pulse amplitude controller for transforming the binary display data by setting a respective voltage amplitude independently for each subframe according to the binary display data so as to generate a display signal having a respective voltage value set independently for each subframe. Thus, an effective voltage according to the gray-scale bits of the input image data is applied to the liquid crystal display layer so as to conduct a gray-scale display for the input image data.

In one embodiment of the invention, a plurality of scanning operations are performed for each of the row electrodes in one frame period of the input image data. The selection period corresponds to a total period during which the scanning signals are applied to the row electrode by the plurality of scanning operations.

In another embodiment of the invention, the row electrodes are selected sequentially to be applied with the scanning signal.

In still another embodiment of the invention, a plurality or all of the row electrodes are selected simultaneously to be applied with which the scanning signal.

According to another aspect of this invention, a liquid crystal display device including a liquid crystal panel is provided. The panel includes: a plurality of row electrodes; a plurality of column electrodes arranged so as to cross the plurality of row electrodes; and a liquid crystal layer interposed between the row electrodes and the column electrodes for displaying images in response to a value of an effective voltage applied between the row electrode and the column electrode at intersections of the row electrodes and the column electrodes. The device includes: a display data transformer for receiving input image data for one frame, for dividing a selection period for each row electrode in the frame into subframes of a number equal to or greater than a number of gray-scale bits representing a gray-scale level of the input image data, the scanning signal being applied to the row electrode during the corresponding selection period, and for generating binary display data in which respective binary data is associated with each subframe according to the gray-scale bits; a pulse width controller for controlling the division of the selection period in the display data transformer and for setting a respective subframe period independently for each subframe; an orthogonal transformer for performing an orthogonal transformation for the binary display data using a predetermined orthogonal matrix to generate transformed display data; a pulse amplitude controller for transforming the transformed display data by setting a respective voltage amplitude independently for each subframe according to the transformed display data so as to generate display signals each having a respective voltage value set independently for each subframe; a column driver for applying the display signals to the plurality of column electrodes; means for generating scanning signals based on the orthogonal matrix; and a row driver for simultaneously selecting at least a predetermined number of the row electrodes out of the plurality of row electrodes and applying the scanning signals to the predetermined number of row electrodes. Thus, an inverse transformation of the orthogonal transformation is performed on the liquid crystal panel, so that effective voltages according to the gray-scale bits of the input image data are applied to the liquid crystal display layer so as to conduct a gray-scale display for the input image data.

According to still another aspect of this invention, a method for driving a liquid crystal display device is provided. The device includes: a plurality of row electrodes; a plurality of column electrodes arranged so as to cross the plurality of row electrodes; and a liquid crystal layer interposed between the row electrodes and the column electrodes for displaying images in response to a value of an effective voltage applied between the row electrode and the column electrode at intersections of the row electrodes and the column electrodes. The method includes the steps of: dividing a selection period for each row electrode in one frame of input image data into subframes of a number equal to or greater than a number of gray-scale bits representing a gray-scale level of the input image data, a scanning signal being applied to the respective row electrode during the selection period; controlling dividing widths for the selection period and for setting a respective subframe period independently for each subframe; generating binary display data in which respective binary data is associated with each subframe according to the grayscale bits; transforming the binary display data by setting a respective voltage amplitude independently for each subframe according to the binary display data so as to generate a display signal having a respective voltage value set independently for each subframe; applying the scanning signal to the corresponding row electrode; and applying the display signal to the plurality of row electrodes in synchronization with the application of the corresponding scanning signal. Thus, effective voltages according to the gray-scale bits of the input image data are applied to the liquid crystal display layer so as to conduct a gray-scale display for the input image data. In one embodiment of the invention, the step of applying the scanning signal is performed for each of the row electrodes for a plurality of times in a single-frame period of the input image data. The selection period corresponds to a total period during which the scanning signal is applied to the row electrode for the plurality of times in the single-frame period.

In another embodiment of the invention, the step of applying the scanning signal is performed by selecting one of the row electrodes successively.

In still another embodiment of the invention, the step of applying the scanning signal is performed by selecting a plurality or all of the row electrodes simultaneously.

According to still another aspect of this invention, a method for driving a liquid crystal display device is provided. The device includes: a plurality of row electrodes; a plurality of column electrodes arranged so as to cross the plurality of row electrodes; and a liquid crystal layer interposed between the row electrodes and the column electrodes for displaying images in response to a value of an effective voltage applied between the row electrode and the column electrode at intersections of the row electrodes and the column electrodes. The method includes the steps of: dividing a selection period for each row electrode in one frame of input image data into subframes of a number equal to or greater than a number of gray-scale bits representing a gray-scale level of the input image data, a scanning signal being applied to the respective row electrode during the selection period; controlling dividing widths for the selection period and for setting a respective subframe period independently for each subframe; generating binary display data in which respective binary data is associated with each subframe according to the grayscale bits; performing an orthogonal transformation for the binary display data using a predetermined orthogonal matrix so as to generate transformed display data; transforming the transformed display data by setting a respective voltage amplitude independently for each subframe according to the transformed display data so as to generate display signals each having a respective voltage value set independently for each subframe; generating scanning signals based on the orthogonal matrix; simultaneously selecting at least a predetermined number of the row electrodes out of the plurality of row electrodes and applying the scanning signals to the predetermined number of row electrodes; and applying the display signals t o a plurality of column electrodes i n synchronization with the application of the scanning signals. Thus, an inverse transformation of the orthogonal transformation is performed on the liquid crystal panel, so that effective voltages according to the gray-scale bits of the input image data are applied to the liquid crystal display layer so as to conduct a gray-scale display for the input image data.

According to still another aspect of this invention, a liquid crystal display device including a liquid crystal panel is provided. The panel includes: a plurality of row electrodes to which scanning signals are applied; a plurality of column electrodes arranged so as to cross the plurality of row electrodes to which display signals are applied; and a liquid crystal layer interposed between the row electrodes and the column electrodes for displaying images in response to a value of an effective voltage applied between the row electrode and the column electrode at intersections of the row electrodes and the column electrodes. The device includes: a display data transformer for receiving input image data for one frame, for providing subframes for a period including a plurality of frames, a number of subframes being equal to or greater than a number of gray-scale bits representing a gray-scale level of the input image data, and for generating binary display data in which respective binary data is associated with each subframe according to the gray-scale bits; a pulse amplitude controller for transforming the binary display data by setting a respective voltage amplitude independently for each subframe according to the binary display data so as to generate a display signal having a respective voltage value set independently for each subframe. Thus, an effective voltage according to the gray-scale bits of the input image data is applied to the liquid crystal display layer so as to conduct a gray-scale display for the input image data.

In one embodiment of the invention, each of the subframes is a horizontal scanning period in a corresponding one of the plurality of frames.

According to still another aspect of this invention, a method for driving a liquid crystal display device is provided. The device includes: a plurality of row electrodes; a plurality of column electrodes arranged to cross the plurality of row electrodes; and a liquid crystal layer interposed between the row electrodes and the column electrodes for displaying images in response to a value of an effective voltage applied between the row electrode and the column electrode at intersections of the row electrodes and the column electrodes. The method includes the steps of: receiving input image data for one frame and, providing subframes for a period including a plurality of frames, a number of the subframes being equal to or greater than a number of gray-scale bits representing a gray-scale level of the input image data; generating binary display data in which respective binary data is associated with each subframe according to the gray-scale bits for each subframe; transforming the binary display data by setting a respective voltage amplitude independently for each subframe according to the binary display data so as to generate a display signal having a respective voltage value set independently for each subframe; applying the scanning signal to the corresponding row electrode; and applying the display signal to the plurality of column electrodes in synchronization with the application of the corresponding scanning signal. Thus, effective voltages according to the gray-scale bits of the input image data are applied to the liquid crystal display layer so as to conduct a gray-scale display for the input image data.

In one embodiment of the invention, each of the subframes is a horizontal scanning period in a corresponding one of the plurality of frames.

Hereinafter, the function of the present invention will be described.

Intersections of a plurality of row electrodes and a plurality of column electrodes are arranged in a matrix, with each intersection corresponding to one pixel. A voltage is applied between the row electrodes and the column electrodes at each intersection. According to the value of the effective voltage being applied, the optical characteristic of a liquid crystal layer is modulated at the intersection, thus displaying images.

There are provided subframes of a number greater than the bit length of data (i.e., the number of grayscale bits) which represent the gray-scale levels of input image data. A period and a voltage value are set independently for each subframe, whereby a certain number of gray-scale levels can be effected with a lesser number of subframes as compared to the conventional frame modulation method. Moreover, by setting the period and the voltage value independently for each subframe, it is possible to avoid the reduction in the minimum pulse width which would occur in the conventional pulse width modulation method as the number of gray-scale levels increases. As a result, flickers in the displayed images and the display non-uniformity caused by the waveform distortion can be suppressed.

Furthermore, image data for one frame is processed as binary display data which is set independently for each subframe. Therefore, it is possible to eliminate the complicated large-scale arithmetic circuit for performing square-sum calculation and square-root extraction, and a high-precision liquid crystal driver for outputting the analog voltage amplitude, which are required in the conventional amplitude modulation method.

Furthermore, by setting a voltage amplitude independently for each subframe, it is possible to construct a display device most suitable for the response performance of the liquid crystal panel and the voltage endurance of the liquid crystal driver.

Thus, the invention described herein makes possible the advantages of: (1) providing a liquid crystal display device capable of conducting a gray-scale display while suppressing flickers in the displayed images which would occur in the frame modulation method and suppressing the display non-uniformity which would occur in the pulse width modulation method, without increasing the circuit scale so significantly as in the amplitude modulation method; and (2) providing a method for driving such a liquid crystal display device.

These and other advantages of the present invention will become apparent to those skilled in the art upon reading and understanding the following detailed description with reference to the accompanying figures.

DESCRIPTION OF THE PREFERRED EMBODIMENTS

Figure 1:
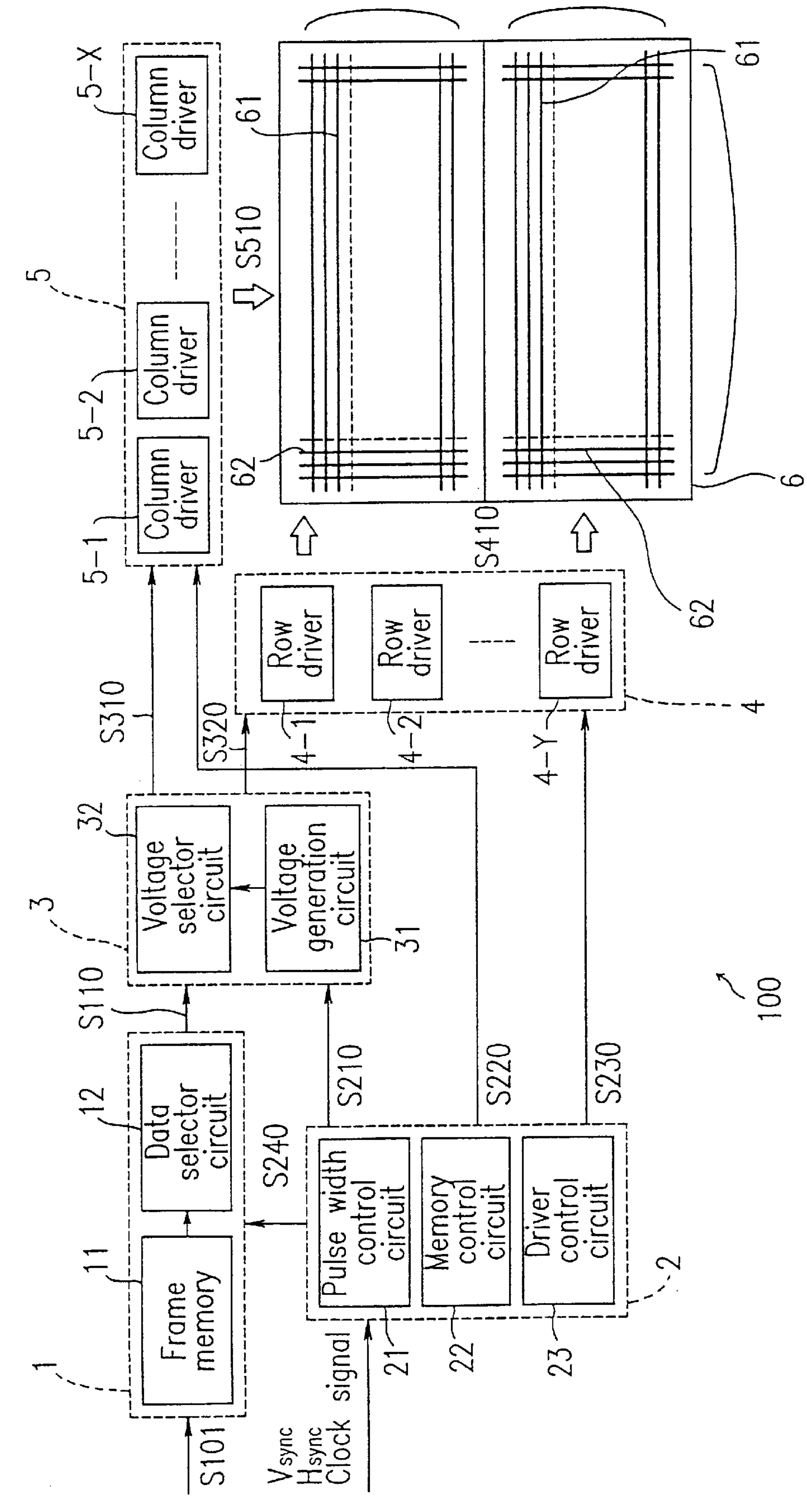
FIG. 1 is a schematic diagram for illustrating a liquid crystal display device and a method for driving the same according to an example of the present invention.

First, the basic principle of the present invention will be described.

Typically, when a period T is divided into a number K of subframes each having a period $T_k$ (where k=1, 2, . . . , K), and a pixel is applied with a respective voltage $V_k$ for the subframe $T_k$. An effective voltage value $V_{rms}$ applied to the pixel for the period T is expressed by Expression 1 below.

(Expression 1)

$$V_{rms} = \sqrt{\frac{T_1 V_1^2 + T_2 V_2^2 + \cdots + T_k V_k^2 + \cdots + T_K V_K^2}{T_1 + T_2 + \cdots + T_k + \cdots + T_K}} \tag{1}$$

Herein, it is assumed that binary display data (i.e., ON and OFF display data) be set for the respective subframe $T_k$. That is, the voltage $V_k$ applied for the subframe $T_k$ is represented by a respective binary value of an ON display voltage $V_{Hk}$ and an OFF display voltage $V_{Lk}$. Accordingly, the effective voltage $V_{rms}$ of Expression 1 to be applied for the period T may take any one of $2^k$ values which are shown in Expression 2 below based on a combination of ON and OFF of the respective subframe $T_k$ in the period T. Thus, it is possible to conduct a grayscale display with $2^k$ levels by dividing the period T into K subframes.

(Expression 2)

$$V_{rms}(1) = \sqrt{\frac{T_1 V_{L1}^2 + T_2 V_{L2}^2 + \cdots + T_k V_{Lk}^2 + \cdots + T_K V_{LK}^2}{T_1 + T_2 + \cdots + T_k + \cdots + T_K}} \quad (2)$$

$$V_{rms}(2) = \sqrt{\frac{T_1 V_{H1}^2 + T_2 V_{L2}^2 + \cdots + T_k V_{Lk}^2 + \cdots + T_K V_{LK}^2}{T_1 + T_2 + \cdots + T_k + \cdots + T_K}}$$

$$\cdots \quad \cdots$$

$$V_{rms}(2^k) = \sqrt{\frac{T_1 V_{H1}^2 + T_2 V_{H2}^2 + \cdots + T_k V_{Hk}^2 + \cdots + T_K V_{HK}^2}{T_1 + T_2 + \cdots + T_k + \cdots + T_K}}$$

However, when a matrix-type liquid crystal panel is driven, the maximum value of a ratio $V_{Hk}/V_{Lk}$ (so called a selection ratio SR) of the ON display voltage $V_{Hk}$ and the OFF display voltage $V_{Lk}$ for a respective subframe is limited by the number N of row electrodes provided in the liquid crystal panel. The maximum selection ratio $SR_{max}$ is expressed by Expression 3 below.

(Expression 3)

$$SR_{max} = \sqrt{\frac{\sqrt{N} + 1}{\sqrt{N} - 1}} \quad (3)$$

Herein, for comparison, when the ON display voltage $V_{Hk}$ and the OFF display voltage $V_{Lk}$ for the corresponding subframe period $T_k$ are set to constant values $V_H$ and $V_L$ as in Expressions 4 and 5 below, respectively, and the selection ratio $V_H/V_L$ is set to its maximum value $SR_{max}$, the value $V_H$ is expressed by Expression 6 below. Expressions 4 to 6 are satisfied in the conventional frame modulation method or the conventional pulse width modulation method.

(Expression 4)

$$V_{H1} = V_{H2} = \ldots = V_{Hk} = \ldots = V_{HK} = V_H \quad (4)$$

(Expression 5)

$$V_{L1} = V_{L2} = \ldots = V_{Lk} = \ldots = V_{LK} = V_L \quad (5)$$

(Expression 6)

$$V_H = SR_{max} \cdot V_L \quad (6)$$

Next, consider to associate the subframes $T_k$ with gray-scale bits of display data.

First, a so-called weighted pulse width modulation method will be described for comparison. According to the method, a gray-scale display is conducted by dividing a period T into subframe periods $T_k$ in such a manner that each subframe period corresponds to the weight of a gray-scale bit (i.e., weighted division). Each of the subframe periods $T_k$ (k=1, 2, . . . , K) is sequentially associated with a respective gray-scale bit in the order of the weight of the gray-scale bits. Specifically, the subframe period $T_1$ corresponds to the least significant bit while the subframe period $T_k$ corresponds to the most significant bit. The proportion of the subframe periods $T_k$ is set as in Expression 7 below so that the duration of the period $T_k$ corresponds to the weight ($2^{k-1}$) of the gray-scale bit.

(Expression 7)

$$T_1 : T_2 : \ldots : T_k : \ldots : T_K = 1 : 2 : \ldots : 2^k : \ldots : 2^{K-1} \quad (7)$$

Herein, in the case where the number K of subframes is set to, for example, three, Expressions 4 to 7 are substituted in Expression 2 to give Expression 8 below, since $2^3=8$. Thus, 8 gray-scale levels are effected.

(Expression 8)

$$_{rms}(1) = V_L \quad (8)$$

$$_{rms}(2) = \sqrt{\frac{SR_{max}^2 + 6}{7}} V_L$$

$$\cdots \quad \cdots$$

$$_{rms}(k) = \sqrt{\frac{(k-1)SR_{max}^2 + (8-k)}{7}} V_L$$

$$\cdots \quad \cdots$$

$$_{rms}(8) = SR_{max} V_L$$

In such a weighted pulse width modulation method, however, the minimum pulse width ($T_1$) decreases as the number of gray-scale levels increases, thereby posing problems such as the display non-uniformity mentioned above. Particularly, the minimum pulse width (i.e., the minimum subframe period $T_1$) rapidly decreases. For example, the minimum pulse width is T/7 for 8 gray-scale levels, T/15 for 16 gray-scale levels, T/31 for 32 gray-scale levels, and so forth.

On the other hand, in the frame modulation method, the minimum subframe period $T_1$ corresponds to one horizontal scanning period in a frame. Therefore, the number of frames required for a gray-scale display increases. For example, the period $T=T_1\times7$ for 8 gray-scale levels, $T=T_1\times15$ for 16 gray-scale levels, $T=T_1\times31$ for 32 gray-scale levels, and so forth. This results in deterioration of display quality such as flickers mentioned above.

The present invention solves these problems by removing (or eliminating) the specific conditions of the subframe period $T_k$ and the applied voltage $V_k$, as those shown in Expressions 4 to 7. Instead, according to the present invention, the period T is divided into subframes in such a manner that the subframe periods $T_k$ are set independently for each subframe from other subframes. Moreover, the voltage value $V_k$ is varied for each subframe so that the ON and OFF display voltages $V_{Hk}$ and $V_{Lk}$ are set independently for the subframe period $T_k$ from other subframes. A voltage value for each subframe is set so that the total (effective) value of the applied voltages for a number n ($\geqq$K) of subframes corresponds to a grayscale bit value (i.e., the gray-scale level represented by K-bit gray-scale data) based on the $2^K$ effective voltage values calculated from Expression 2. Thus, a number of gray-scale levels are effected without causing the above-mentioned problems by applying voltage values which are set suitable for the response characteristics of the liquid crystal panel.

When employing the present invention with the pulse width modulation method (as in Examples 1 and 2 below), the period T corresponds to a total time period during which a single scanning electrode is selected so as to display one frame of input image data during one frame period of the input image data. For example, according to a line-sequential driving method in a single-scanning mode, the period T for each scanning electrode corresponds to a horizontal scanning period of the input image data. On the other hand, according to a line-sequential driving method in a dual-scanning mode, typically, both upper and lower halves of the liquid crystal panel are scanned twice in a single-frame period. Therefore, in the dual-scanning mode, the total period T during which a scanning line is selected by two scanning operations corresponds to two horizontal scanning periods of the input image data.

When the present invention is applied to the frame modulation method (as in Example 3 below), the subframe period $T_k$ corresponds to one horizontal scanning period $T_{Hsync}$. That is, all the subframe periods $T_k$ are set equal ($=T_{Hsync}$), while the voltage value $V_k$ is varied for each subframe period $T_k$. When a gray-scale level is effected on a pixel by time-averaging over n frames of the frame modulation scheme, the total period T is expressed by $n \times T_{Hsync}$.

According to the conventional frame modulation method, one of the fixed voltages (i.e., the ON display voltage $V_H$ or the OFF display voltage $V_L$) is applied for each subframe period $T_k$ (i.e., the horizontal scanning period $T_{Hsync}$) during a plurality of frames as shown in Expressions 4 and 5. Thus, as described above, as the number of gray-scale levels increases, the number of frames to be averaged (.i.e., the number of gray-scale levels −1) increases.

In the present invention, the voltage value $V_k$ applied to a pixel is varied and set independently for each subframe period $T_k$ (i.e., the horizontal scanning period in each frame) based on the gray-scale level to be effected on the pixel for the frame. Therefore, a certain number of gray-scale levels can be effected by time-averaging over a lesser number of frames than that of the conventional techniques.

Hereinafter, the present invention will be described by way of illustrative examples.

EXAMPLE 1

FIG. 1 schematically shows a liquid crystal display device 100 according to Example 1 of the present invention. In this example, the line-sequential driving method is employed for the liquid crystal display device 100.

As shown in FIG. 1, the liquid crystal display device 100 includes a display data transformation circuit 1, a timing control circuit 2, a pulse amplitude control circuit 3, a group of row drivers 4, a group of column drivers 5, and a liquid crystal panel 6.

The liquid crystal panel 6 includes 2×N row electrodes 61 and M column electrodes 62 which are arranged so as to cross the row electrodes 61. Intersections of the row electrodes 61 and the column electrodes 62 are arranged in a matrix. A liquid crystal layer (not shown) is interposed between the row electrodes 61 and the column electrodes 62. The liquid crystal layer at each intersection corresponds to a respective pixel. The optical state of the liquid crystal layer at each pixel changes in response to an effective value of a driving voltage applied across the row electrodes 61 and the column electrodes 62 so as to transformation circuit 1 by the frame. The display data transformation circuit 1 includes a frame memory 11 and a data selector circuit 12. The display data transformation circuit 1 divides one frame into subframes of a number equal to or greater than the gray-scale bit length, and outputs the received image data S101 as binary display data S110 for each subframe.

The vertical synchronization signal, the horizontal synchronization signal, and the clock signal are input to the timing control circuit 2. The timing control circuit 2 includes a pulse width control circuit 21 for setting a period independently for each subframe, a memory control circuit 22, and a driver control circuit 23 for generating timing signals which operates the group of row drivers 4 and the group of column drivers 5. The timing control circuit 2 is responsible for timing controls of the entire system. The pulse width control circuit 21 and the memory control circuit 22 output various control signals indicated by S240 for controlling the operation of the display data transformation circuit The pulse amplitude control circuit 3 includes a voltage generation circuit 31 and a voltage selector circuit 32. The pulse amplitude control circuit 3 receives the binary display data S110 output from the display data transformation circuit 1, and sets a voltage amplitude independently for each subframe based on a timing signal S210 from the timing control circuit 2.

The group of row drivers 4 apply scanning signals to the row electrodes 61 in the liquid crystal panel 6 based on a signal S320 which is output from the pulse amplitude control circuit 3 and a signal S230 which is output from the timing control circuit 2. Similarly, the group of column drivers 5 apply display signals corresponding to the input image data S101 to the column electrodes 62 of the liquid crystal panel 6 based on a signal S310 which is output from the pulse amplitude control circuit 3 and a signal S220 which is output from the timing control circuit 2.

As shown in FIG. 1, the liquid crystal panel 6 is of the dual-scanning type, and the panel 6 is divided into two display areas (lower half and upper half) each of which is driven independently. A number N of row electrodes are provided in each display area. The group of row drivers 4 include a plurality of row drivers 4-1, 4-2, . . . , 4-Y according to the number N of the row electrodes 61. The voltage signals S320 output from the pulse amplitude control circuit 3 are successively applied as scanning signals to the row electrodes 61. Similarly, the group of column drivers 5 include a plurality of column driver 5-1, 5-2, . . . , 5-X according to the number M of the column electrodes 62. The voltage signals S310 output from the pulse amplitude control circuit 3 are simultaneously applied as data signals to the M column electrodes 62.

In the present example, the liquid crystal panel 6 used in the liquid crystal display device 100 is a color liquid crystal panel having 240 row electrodes (N=240) for each display area, 1920 column electrodes (M=1920=640×RGB), a threshold voltage of about 2.3 V, and a response rate ($\tau_r+\tau_d$) of about 130 ms. A gray-scale display with 32 levels effected on the upper display area will be explained in the following description. However, it is understood that a gray-scale display is similarly conducted on the lower display area.

Figure 2:
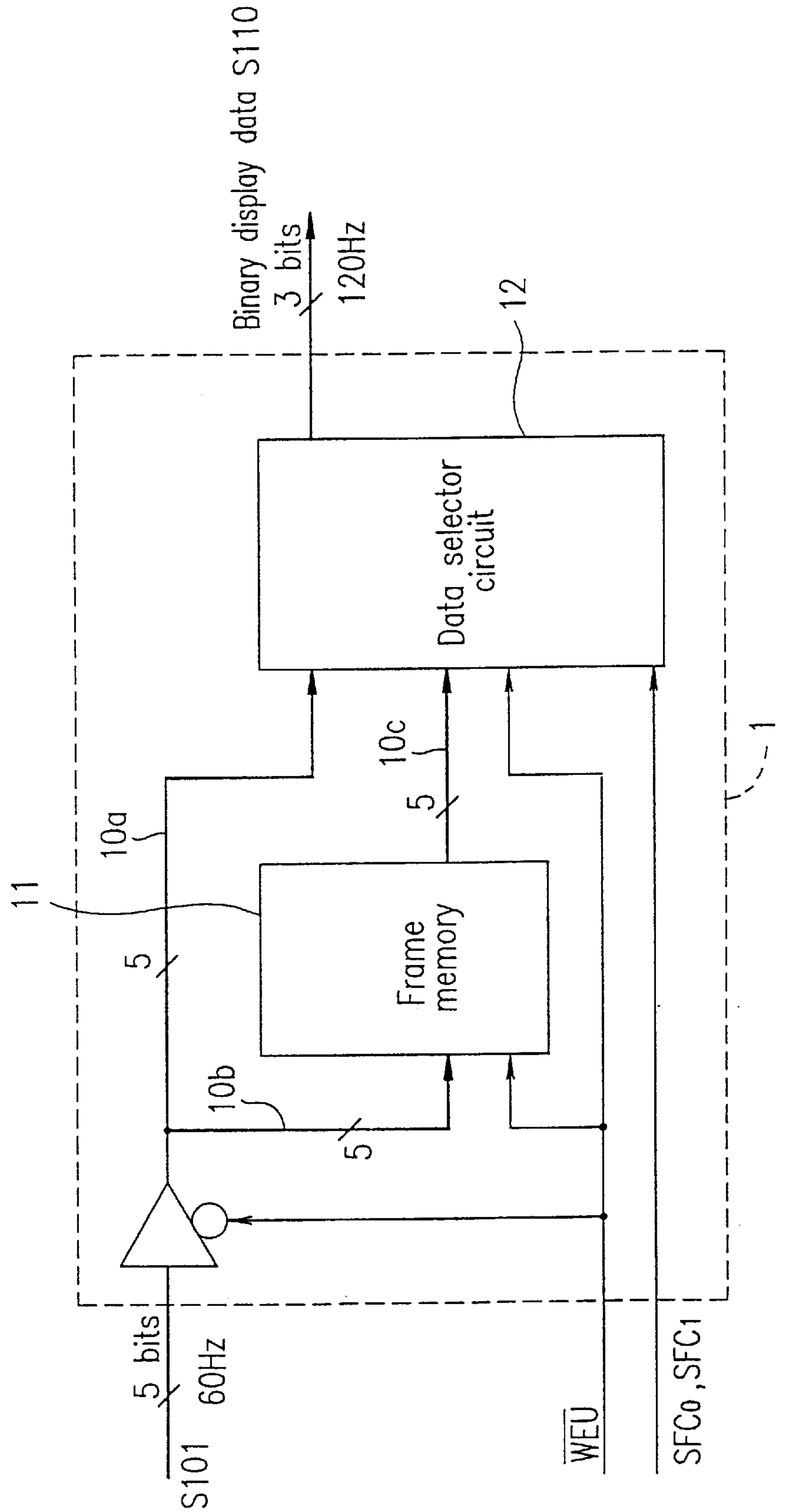
FIG. 2 is a schematic diagram illustrating a configuration of a display data transformation circuit in a liquid crystal display device according to an example of the present invention.
Figure 3A:
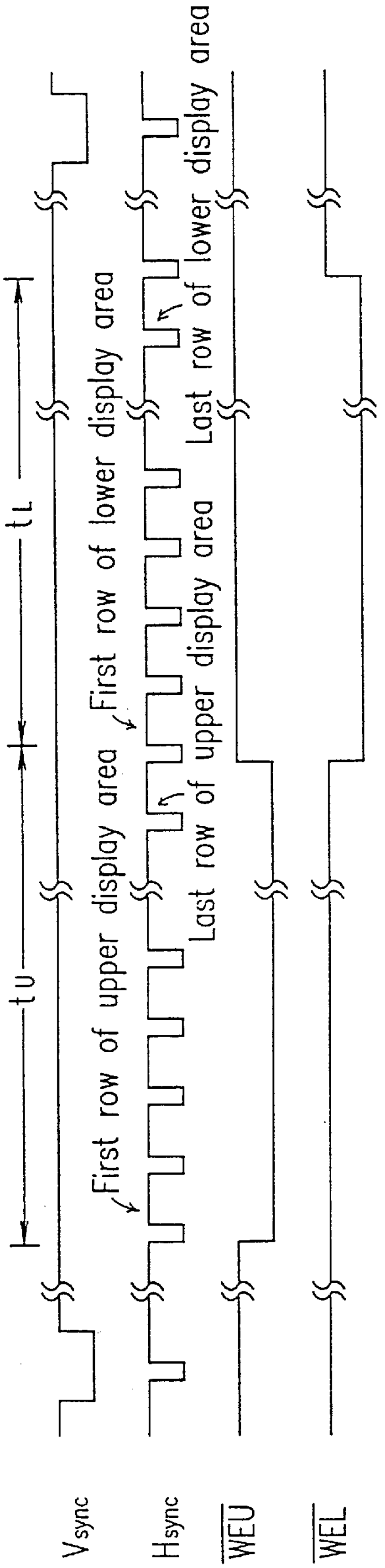
FIGS. 3A and 3B are diagrams illustrating various timing signals of a timing control circuit and a configuration of subframes of a liquid crystal display device according to an example of the present invention.
Figure 3B:
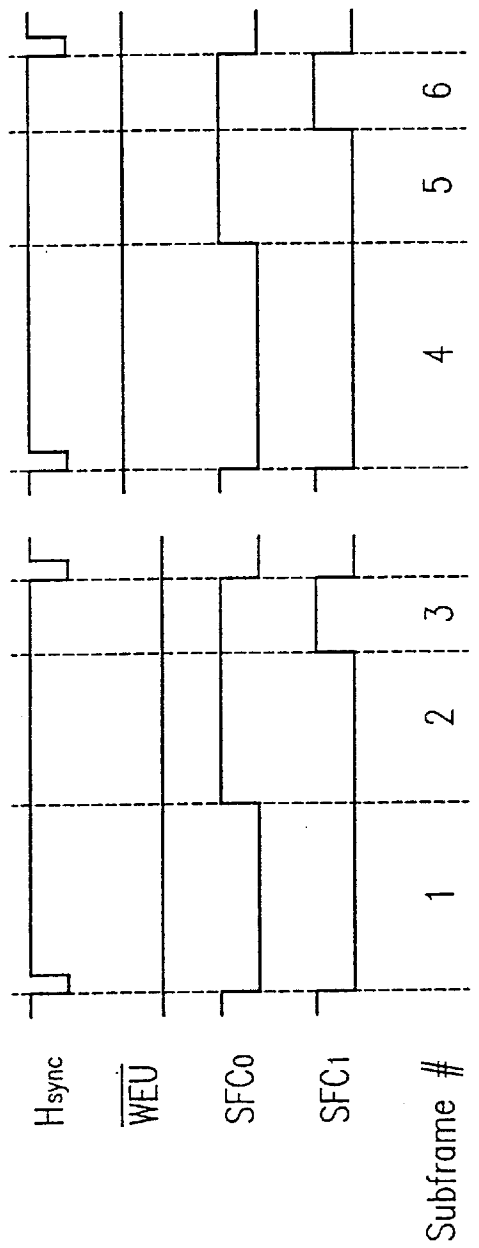

FIG. 2 shows the configuration of the display data transformation circuit 1. FIGS. 3A and 3B are timing diagrams for illustrating the operation of the display data transformation circuit 1.

As shown in FIG. 2, the display data transformation circuit 1 includes the frame memory 11 and the data selector circuit 12. The frame memory 11 includes a memory for the upper display area and a memory for the lower display area (not shown). As shown in FIG. 2, in the display data transformation circuit 1, the image data S101 in the single-scanning mode is supplied from a signal source and written into the frame memory 11. In the present example, it is assumed that the image data S101 have a frequency of 60 Hz and a bit length of 5.

The write operations into the frame memory 11 is controlled based on a write signal $\overline{WEU}$ (for the memory for the upper display area). As shown in FIG. 3A, the write signal $\overline{WEU}$ goes low (at the L level) for a period $t_U$ during which the image data for the upper display area is input from the signal source. The write operations to the memory for the upper display area are performed in this period $t_U$. The write signal $\overline{WEU}$ goes high (at the H level) for a period $t_L$ during which the image data for the lower display area is input and for vertical interval periods. Read operations for the memory for the upper display area are performed in this period $t_L$. In FIG. 3A, $V_{sync}$ and $H_{sync}$ represent the vertical synchronization signal and the horizontal synchronization signal, respectively, which are input with the image data S101.

Figure 6:
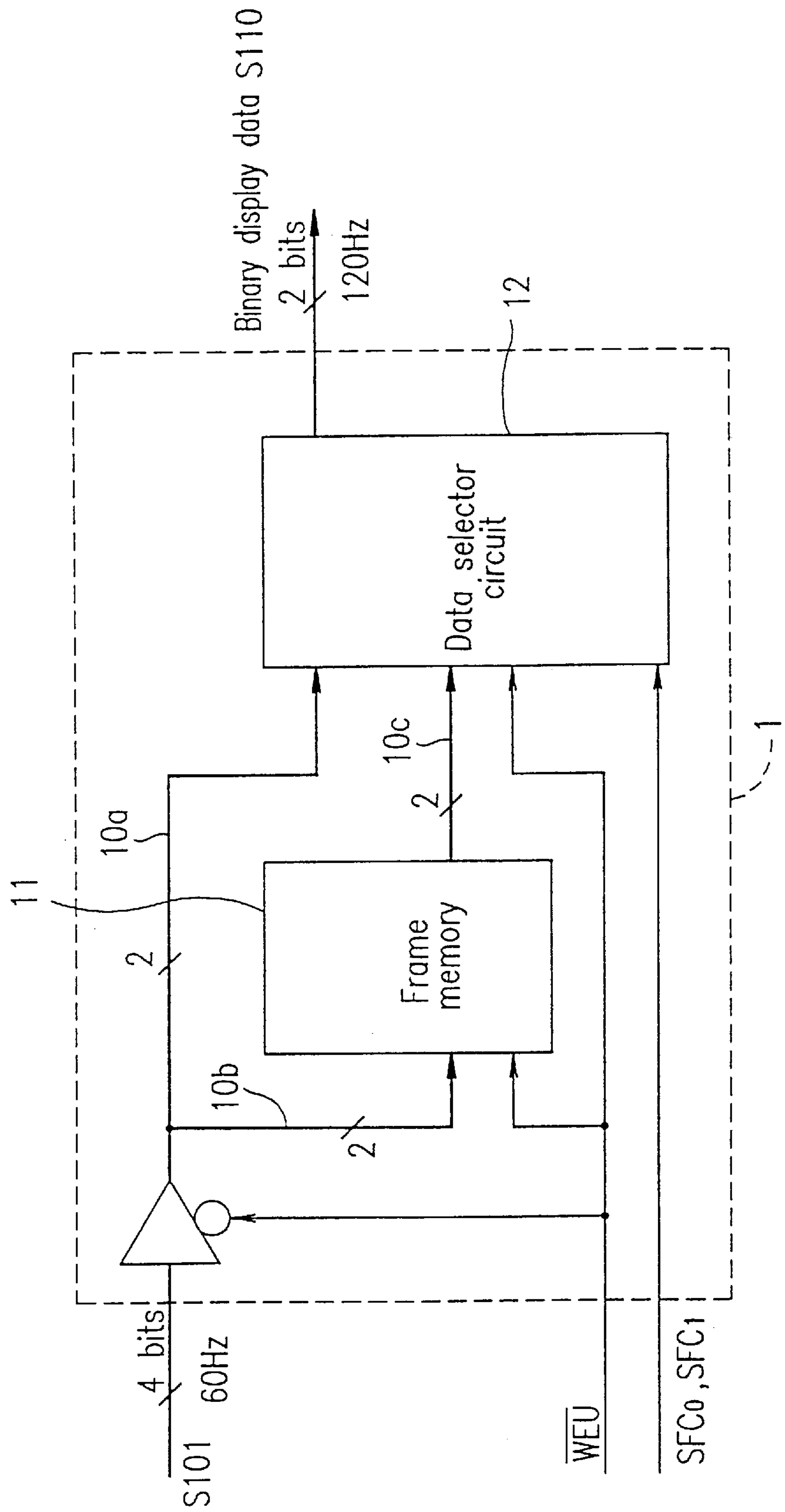
FIG. 6 is a schematic diagram illustrating another configuration of a display data transformation circuit in a liquid crystal display device according to an example of the present invention.

The write signal $\overline{WEU}$ and subframe count signals $SFC_0$ and $SFC_1$ output from the pulse width control circuit 21 are input to the data selector circuit 12. Subframes are provided based on these signals. As shown in FIG. 3B, 6 subframes are provided corresponding to 6 combinations of levels of the signals ($\overline{WEU}$, $SFC_0$, and $SFC_1$), i.e., the signal level combinations of (L, L, L), (L, H, L), (L, H, H), (H, L, L), (H, H, L), and (H, H, H).

The 5-bit image data S101 supplied from the signal source is controlled by the write signal $\overline{WEU}$ as follows. For the period $t_U$ during which the write signal $\overline{WEU}$ is at the L level, the image data S101 is input to the data selector circuit 12 via a line 10*a*. Simultaneously, the image data is written in the frame memory 11 via a line 10*b*. After being input to the data selector circuit 12, the image data S101 (for the upper display area) is transformed into binary display data, as will be described later, and is output as a 3-bit binary display data S110.

For the period $t_L$ during which the write signal $\overline{WEU}$ is at the H level and the write signal $\overline{WEL}$ (for the memory for the lower display area) is at the L level, the 5-bit display data (for the upper display area) which has been written in the frame memory 11 for the upper display area is read out and input to the data selector circuit 12 via a line 10*c*. As in the period $t_U$, the image data (for the upper display area) which has been input to the data selector circuit 12 is transformed into binary display data and output as the 3-bit binary display data S110.

Accordingly, the same image data S101 (for the upper display area) is input to the data selector circuit 12 at a frequency of 120 Hz, thereby doubling the frame frequency so as to reduce the frame response effect described in the description of the related art.

Table 1 below shows an example of the period (μs) and the voltage amplitudes (V) for each subframe in the case where 32 gray-scale levels are effected using the subframes described above. In the present example, the minimum subframe period is about 6.0 μs, and the total period T including 6 subframes is about 66.0 μs. Therefore, 32 gray-scale levels can be effected by the minimum subframe period T/11.

According to the conventional weighted pulse width modulation method, the minimum pulse width (the minimum subframe period $T_1$) must be set to about T/31 in order to effect 32 gray-scale levels. Thus, according to the present invention, it is possible to eliminate problems such as the display non-uniformity due to the decrease in the minimum pulse width.

TABLE 1

| Subframe # | 1 | 2 | 3 | 4 | 5 | 6 |
|---|---|---|---|---|---|---|
| Period (μs) | 15.0 | 12.0 | 6.0 | 18.0 | 9.0 | 6.0 |
| Scanning signal voltage (V) | ±26.04 | ±26.04 | ±26.04 | ±26.04 | ±26.04 | ±26.04 |
| Data signal voltage (V) | ±2.12 | ±2.12 | ±2.12 | ±1.06 | ±1.06 | ±1.06 |
| ON display effective voltage (V) | 2.789 | 2.789 | 2.789 | 2.044 | 2.044 | 2.044 |
| OFF display effective voltage (V) | 2.619 | 2.619 | 2.619 | 1.928 | 1.928 | 1.928 |

| Input Upper → data → Lower | | | | | Binary display data for each subframe | | | | | | Effective voltage (V) |
|---|---|---|---|---|---|---|---|---|---|---|---|
| 1 | 1 | 1 | 1 | 1 | ON | ON | ON | ON | ON | ON | 2.445 |
| 1 | 1 | 1 | 1 | 0 | ON | ON | ON | ON | ON | OFF | 2.437 |
| 1 | 1 | 1 | 0 | 1 | ON | ON | ON | ON | OFF | ON | 2.432 |
| 1 | 1 | 1 | 0 | 0 | ON | ON | OFF | ON | ON | ON | 2.428 |
| 1 | 1 | 0 | 1 | 1 | ON | ON | ON | ON | OFF | OFF | 2.424 |
| 1 | 1 | 0 | 1 | 0 | ON | ON | ON | OFF | ON | ON | 2.419 |
| 1 | 1 | 0 | 0 | 1 | ON | ON | OFF | ON | OFF | ON | 2.415 |
| 1 | 1 | 0 | 0 | 0 | ON | ON | ON | OFF | ON | OFF | 2.411 |
| 1 | 0 | 1 | 1 | 1 | ON | ON | ON | OFF | OFF | ON | 2.406 |
| 1 | 0 | 1 | 1 | 0 | ON | ON | OFF | OFF | ON | ON | 2.402 |
| 1 | 0 | 1 | 0 | 1 | ON | ON | ON | OFF | OFF | OFF | 2.398 |
| 1 | 0 | 1 | 0 | 0 | ON | OFF | OFF | ON | ON | ON | 2.393 |
| 1 | 0 | 0 | 1 | 1 | ON | ON | OFF | OFF | OFF | ON | 2.389 |
| 1 | 0 | 0 | 1 | 0 | ON | OFF | OFF | ON | ON | OFF | 2.385 |
| 1 | 0 | 0 | 0 | 1 | ON | ON | OFF | OFF | OFF | OFF | 2.380 |
| 1 | 0 | 0 | 0 | 0 | OFF | ON | ON | OFF | ON | ON | 2.376 |
| 0 | 1 | 1 | 1 | 1 | ON | OFF | OFF | ON | OFF | OFF | 2.371 |
| 0 | 1 | 1 | 1 | 0 | OFF | OFF | ON | ON | ON | ON | 2.367 |
| 0 | 1 | 1 | 0 | 1 | OFF | ON | ON | OFF | OFF | ON | 2.363 |
| 0 | 1 | 1 | 0 | 0 | OFF | OFF | ON | ON | ON | OFF | 2.358 |
| 0 | 1 | 0 | 1 | 1 | OFF | ON | ON | OFF | OFF | OFF | 2.354 |
| 0 | 1 | 0 | 1 | 0 | OFF | OFF | OFF | ON | ON | ON | 2.349 |
| 0 | 1 | 0 | 0 | 1 | OFF | OFF | ON | ON | OFF | OFF | 2.345 |
| 0 | 1 | 0 | 0 | 0 | OFF | OFF | OFF | ON | ON | OFF | 2.340 |
| 0 | 0 | 1 | 1 | 1 | OFF | OFF | OFF | ON | OFF | ON | 2.336 |
| 0 | 0 | 1 | 1 | 0 | OFF | OFF | ON | OFF | ON | OFF | 2.331 |
| 0 | 0 | 1 | 0 | 1 | OFF | OFF | OFF | ON | OFF | OFF | 2.327 |
| 0 | 0 | 1 | 0 | 0 | OFF | OFF | OFF | OFF | ON | ON | 2.322 |

TABLE 1-continued

| | | | | | | | | | | | |
|---|---|---|---|---|---|---|---|---|---|---|---|
| 0 | 0 | 0 | 1 | 1 | OFF | OFF | ON | OFF | OFF | OFF | 2.318 |
| 0 | 0 | 0 | 1 | 0 | OFF | OFF | OFF | OFF | ON | OFF | 2.313 |
| 0 | 0 | 0 | 0 | 1 | OFF | OFF | OFF | OFF | OFF | ON | 2.309 |
| 0 | 0 | 0 | 0 | 0 | OFF | OFF | OFF | OFF | OFF | OFF | 2.300 |

According to Table 1, six subframes are provided for 5-bit input image data S101 ($2^5$=32 gray-scale levels). First, the 5-bit image data is transformed into binary display data (6-bit data) having a binary value (ON or OFF) for each subframe according to the corresponding bit values of the image data. Then, based on the binary value of each subframe, either the ON or OFF display voltage, which is set independently for each subframe, is applied during the subframe. The "effective voltage" column in Table 1 shows effective voltage values obtained across the 6-subframe period.

Exact effective voltage values can be obtained from the subframe periods $T_k$ and the voltage values $V_k$ for the subframe by calculation according to Expression 2 above. In practice, however, the effective voltage values can be set by using a more simplified method. This will be described with the example of Table 1.

The subframe periods $T_k(\mu s)$ and the voltage values $V_k$ (V) of the data signal (herein, k=1 to 6) for the subframe periods $T_k$ are set to have such proportions as shown in the following Expressions 9 and 10, respectively.

(Expression 9)

$$T_1:T_2:T_3:T_4:T_5:T_6=5:4:2:6:3:2 \quad (9)$$

(Expression 10)

$$V_1:V_2:V_3:V_4:V_5:V_6=2:2:2:1:1:1 \quad (10)$$

With the proportional constants shown in Expressions 9 and 10, binary display states $H_k$ (ON) and $L_k$ (OFF) for the respective frame period $T_k$ can be expressed as Expression 11 below.

(Expression 11)

$$H_1=T_1\times V_1\times 1=10,\ L_1=T_1\times V_1\times 0=0$$

$$H_2=T_2\times V_2\times 1=8,\ L_2=T_2\times V_2\leqq 0=0$$

$$H_3=T_3\times V_3\times 1=4,\ L_3=T_3\times V_3\times 0=0$$

$$H_4=T_4\times V_4\times 1=6,\ L_4=T_4\times V_4\times 0=0$$

$$H_5=T_5\times V_5\times 1=3,\ L_5=T_5\times V_5\times 0=0$$

$$H_6=T_6\times V_6\times 1=2,\ L_6=T_6\times V_6\times 0=0 \quad (11)$$

Accordingly, for a single-frame period including 6 subframe periods, 32 integer values as shown in Expression 12 below can be obtained according to the binary display data (6-bit) representing the gray-scale levels (5-bit) of the input data.

(Expression 12)

$$H_1+H_2+H_3+H_4+H_5+H_6=33$$

$$H_1+H_2+H_3+H_4+H_5+L_6=31$$

$$H_1+H_2+H_3+H_4+L_6+H_6=30$$

- - -

$$L_1+L_2+L_3+L_4+H_6+L_6=3$$

$$L_1+L_2+L_3+L_4+L_5+H_6=2$$

$$L_1+L_2+L_3+L_4+L_5+L_6=0 \quad (12)$$

Although, two values "1" and "32" are not available as can be seen from Expression 12, this would not be a problem in conducting a gray-scale display in practice since these values can be substituted by "0" and "33", respectively. In practice, the effective voltage values are set by first setting the ratios of the subframe periods $T_k$ and the voltage values $V_k$ for the subframe periods and adjusting the voltage values $V_k$ while maintaining the ratios unchanged. In the example of Table 1, the scanning signal voltage value is fixed while the data signal voltage value is varied. However, it is also applicable to fix the data signal voltage value while varying the scanning signal voltage value. However, it is difficult to vary both the scanning signal voltage value and the data signal voltage value by using a simplified method so that the effective voltage values should be calculated based on Expression 2 above.

Figure 4:
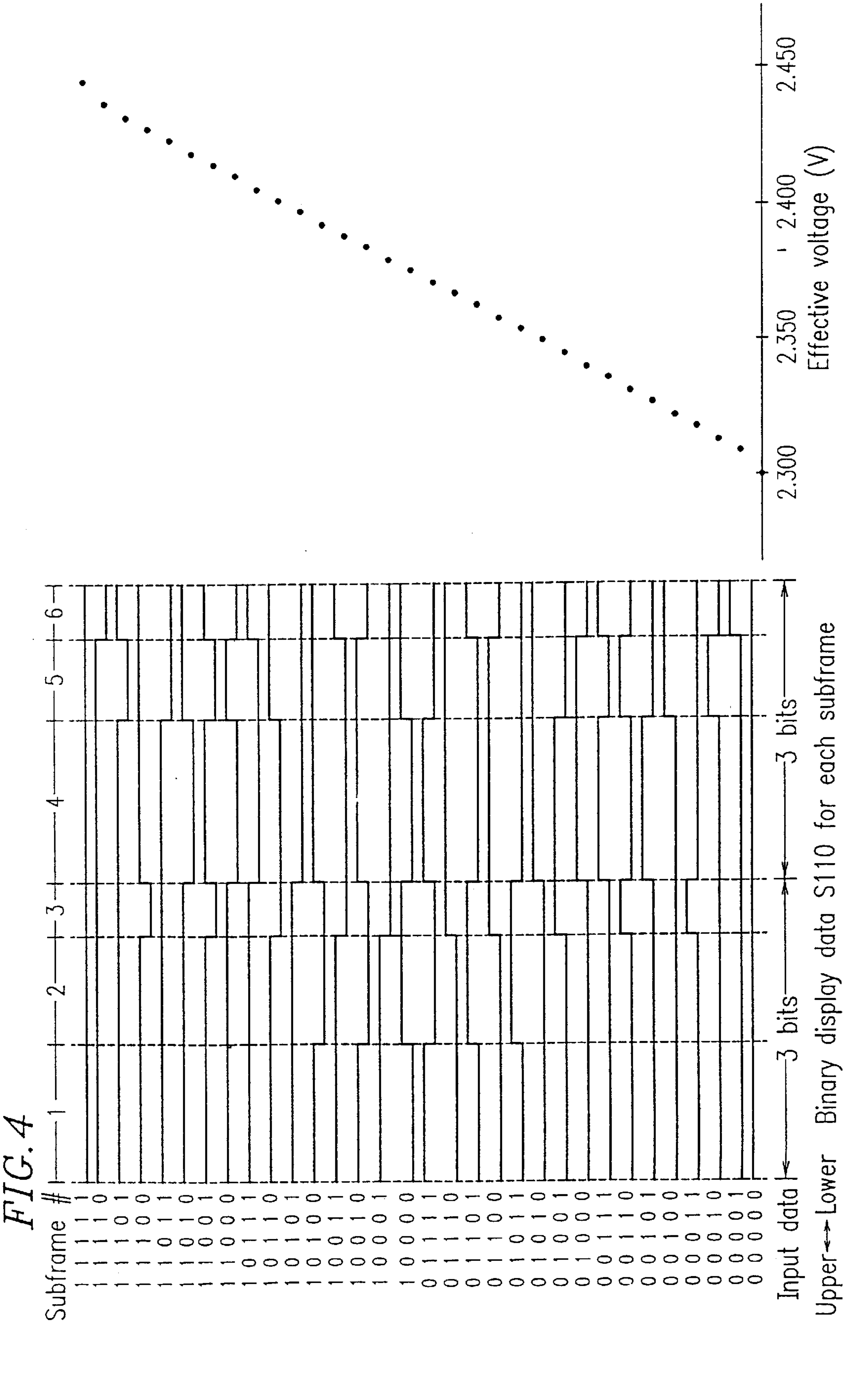
FIG. 4 is a diagram illustrating binary display data generated by a display data transformation circuit and effective voltages corresponding to the generated display data of a liquid crystal display device according to an example of the present invention.

FIG. 4 is a graphical illustration of the binary display data and the effective voltage values shown in Table 1. As can be seen from FIG. 4, by setting the period and the applied voltage for each subframe according to Table 1, a number of gray-scale levels can be effected based on the effective voltage value obtained for the total period of all the subframes.

The data selector circuit 12 outputs the binary display data S110 as shown in Table 1 and FIG. 4. Although the number of subframes is set to six herein, the same data is output twice due to the doubled frequency of 120 Hz as described above. Therefore, the binary display data S110 is output twice by three bits at a time. That is, as shown in FIG. 3B, three subframes are provided for each of the period during which the write signal $\overline{WEU}$ is at the L level and the period during which the write signal $\overline{WEU}$ is at the H level. Therefore, for each of the periods, the binary display data to be output in one horizontal synchronization period includes 3 bits.

The period and the voltage amplitude for each subframe are not limited to those shown in Table 1. These values can be set to other values suitable for the response characteristics of the liquid crystal panel 6, the voltage endurance of the row and column driver groups 4 and 5, and the like.

Figure 5:
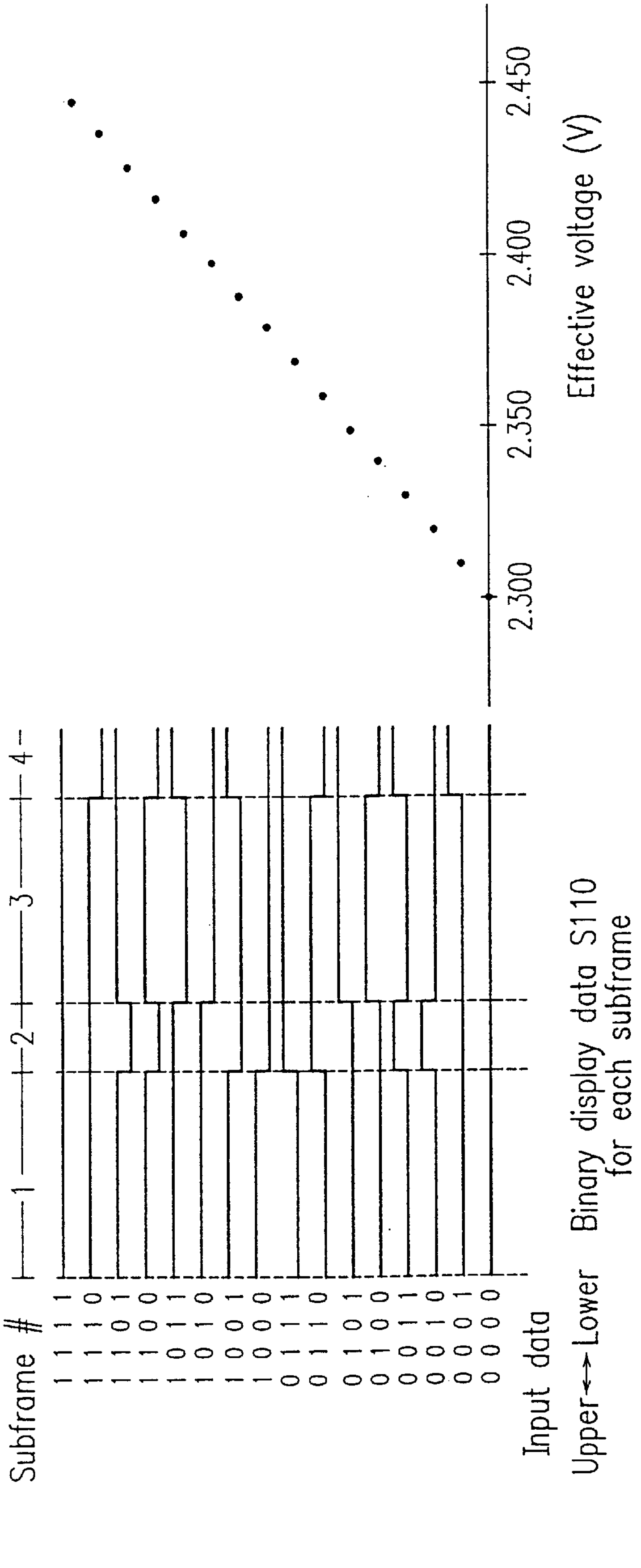
FIG. 5 is a diagram illustrating another binary display data generated by the display data transformation circuit and effective voltages corresponding to the generated display data of a liquid crystal display device according to an example of the present invention.

Table 2 below shows an example in which 4 subframes are provided for the 4-bit input image data S101 ($2^4$=16 gray-scale levels). FIG. 5 is a graphical illustration of the binary display data and the effective voltage values shown in Table 2. FIG. 6 shows the configuration of the display data transformation circuit 1 for the 4-bit input image data S101.

TABLE 2

| Subframe # | 1 | 2 | 3 | 4 |
|---|---|---|---|---|
| Period (μs) | 26.4 | 6.6 | 26.4 | 6.6 |
| Scanning signal voltage (V) | ±26.04 | ±26.04 | ±26.04 | ±26.04 |
| Data signal | ±2.12 | ±2.12 | ±1.06 | ±1.06 |

TABLE 2-continued

| | | | | |
|---|---|---|---|---|
| voltage (V) | | | | |
| ON display effective voltage (V) | 2.792 | 2.792 | 2.048 | 2.048 |
| OFF display effective voltage (V) | 2.621 | 2.621 | 1.932 | 1.932 |

| Input Upper → data → Lower | | | | Binary display data for each subframe | | | | Effective voltage (V) |
|---|---|---|---|---|---|---|---|---|
| 1 | 1 | 1 | 1 | ON | ON | ON | ON | 2.445 |
| 1 | 1 | 1 | 0 | ON | ON | ON | OFF | 2.436 |
| 1 | 1 | 0 | 1 | ON | OFF | ON | ON | 2.426 |
| 1 | 1 | 0 | 0 | ON | OFF | ON | OFF | 2.417 |
| 1 | 0 | 1 | 1 | ON | ON | OFF | ON | 2.407 |
| 1 | 0 | 1 | 0 | ON | ON | OFF | OFF | 2.398 |
| 1 | 0 | 0 | 1 | ON | OFF | OFF | ON | 2.388 |
| 1 | 0 | 0 | 0 | ON | OFF | OFF | OFF | 2.379 |
| 0 | 1 | 1 | 1 | OFF | ON | ON | ON | 2.369 |
| 0 | 1 | 1 | 0 | OFF | ON | ON | OFF | 2.359 |
| 0 | 1 | 0 | 1 | OFF | OFF | ON | ON | 2.349 |
| 0 | 1 | 0 | 0 | OFF | OFF | ON | OFF | 2.340 |
| 0 | 0 | 1 | 1 | OFF | ON | OFF | ON | 2.330 |
| 0 | 0 | 1 | 0 | OFF | ON | OFF | OFF | 2.320 |
| 0 | 0 | 0 | 1 | OFF | OFF | OFF | ON | 2.310 |
| 0 | 0 | 0 | 0 | OFF | OFF | OFF | OFF | 2.300 |

When subframes are set as shown in Table 2, it is possible to associate each of the subframes with a respective one of the gray-scale bits of the input image data S101, so that ON and OFF of the binary display data S110 corresponds to "1" and "0" of the input image data S101. Therefore, for a period $t_U$ during which the image data S101 (for the upper display area) is input, the upper two bits of the image data S101, which correspond to the binary display data S110 (two bits) required for this period $t_U$, are input to the data selector circuit 12 via the line 10*a*. Simultaneously, the other (lower) two bits of the image data S101 (for the upper display area) are written to the frame memory 11 via the line 10*b* (see FIG. 6).

During the period to, the data selector circuit 12 assigns the upper two bits of the received image data S101 to the corresponding subframe periods and outputs the 2-bit binary data S110, as shown in FIG. 5. During the period $t_L$, the image data S101 (lower two bits) which has been written in the frame memory 11 is input to the data selector circuit 12 via the line 10*c*. Similarly, the data selector circuit 12 assigns the lower two bits of the received image data S101 to the corresponding subframe periods and outputs the 2-bit binary data S110.

Thus, only the lower two bits (the two bits used for the subframes #3 and #4 of the binary data S110) have to be read out from and written into the frame memory 11. Therefore, by associating each subframe of the binary display data S110 with a respective gray-scale level of the input image data S101, the capacity of the frame memory 11 can be reduced by half. As can be seen from FIG. 5, by setting the period and the applied voltage for each subframe according to Table 2, a number of grayscale levels can be effected based on the effective voltage value obtained for the total period of all the subframes.

Figure 7:
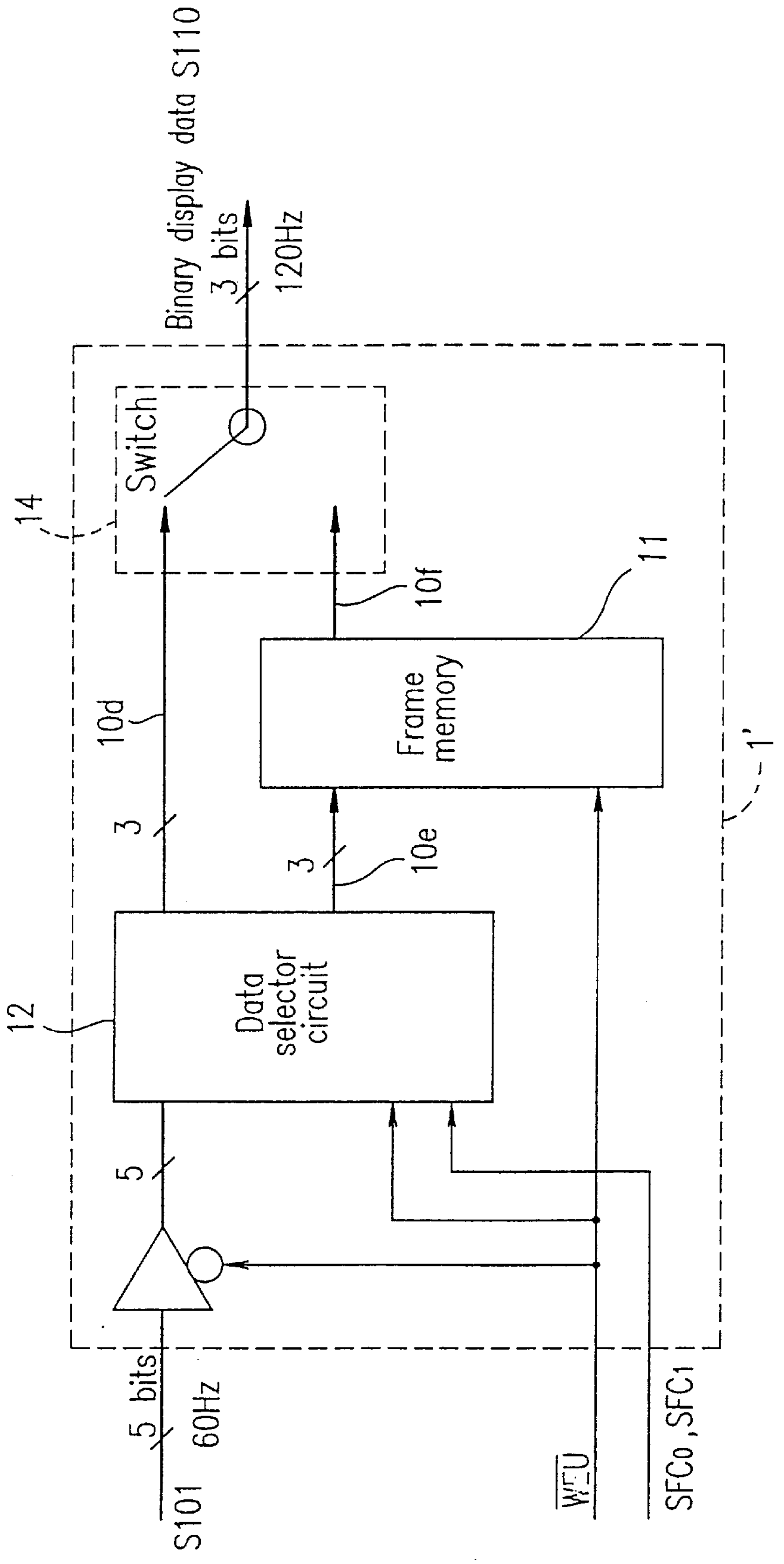
FIG. 7 is a schematic diagram illustrating still another configuration of a display data transformation circuit in a liquid crystal display device according to an example of the present invention.

Hereinafter, another example of the display data transformation circuit will be described, where the required capacity of the frame memory 11 can be reduced by half. FIG. 7 shows the configuration of such a display data transformation circuit 1' which can effect 32 gray-scale levels as shown in Table 1. As shown in FIG. 7, the display data transformation circuit 1' includes the frame memory 11, the data selector circuit 12, and a switching circuit 14. In the display data transformation circuit 1', the 5-bit input image data S101 is input to the data selector circuit 12 in the period t, during which data for the upper display area is input. Then, the data selector circuit 12 transforms the received 5-bit input image data S101 into the 6-bit binary display data S110 as shown in Table 1 and FIG. 4.

The upper three bits (subframes #1 to #3) of the 6-bit binary display data S110 which are required for the period $t_U$ are applied to the switching circuit 14 via a line 10*d*. Simultaneously, during the period $t_U$, the other (lower) three bits (subframes #4 to #6) of the 6-bit binary display data S110 are written to the frame memory 11 via a line 10*e*. During the period $t_L$ the lower three bits of the binary data S110 which have been written to the frame memory 11 are read out and applied to the switching circuit 14 via a line 10*f*.

During the period $t_U$, the switching circuit 14 enables the line 10*d* and prohibits the line 10*f*. The switching circuit 14 may be controlled by, for example, the write signal $\overline{WEU}$. During the period $t_L$ the switching circuit 14 enables the line 10*f* and prohibits the line 10*d*.

Therefore, during the period $t_U$, the upper three bits of the binary display data S110 from the data selector circuit 12 are output via the switching circuit 14, whereas, during the period $t_L$, the lower three bits of the binary display data S110 from the frame memory 11 are output via the switching circuit 14.

When the display data transformation circuit 1' is constructed as described above, only three bits of the binary data S110 have to be read out from and written into the frame memory 11, whereby the required capacity of the frame memory 11 is reduced by half.

Figure 8:
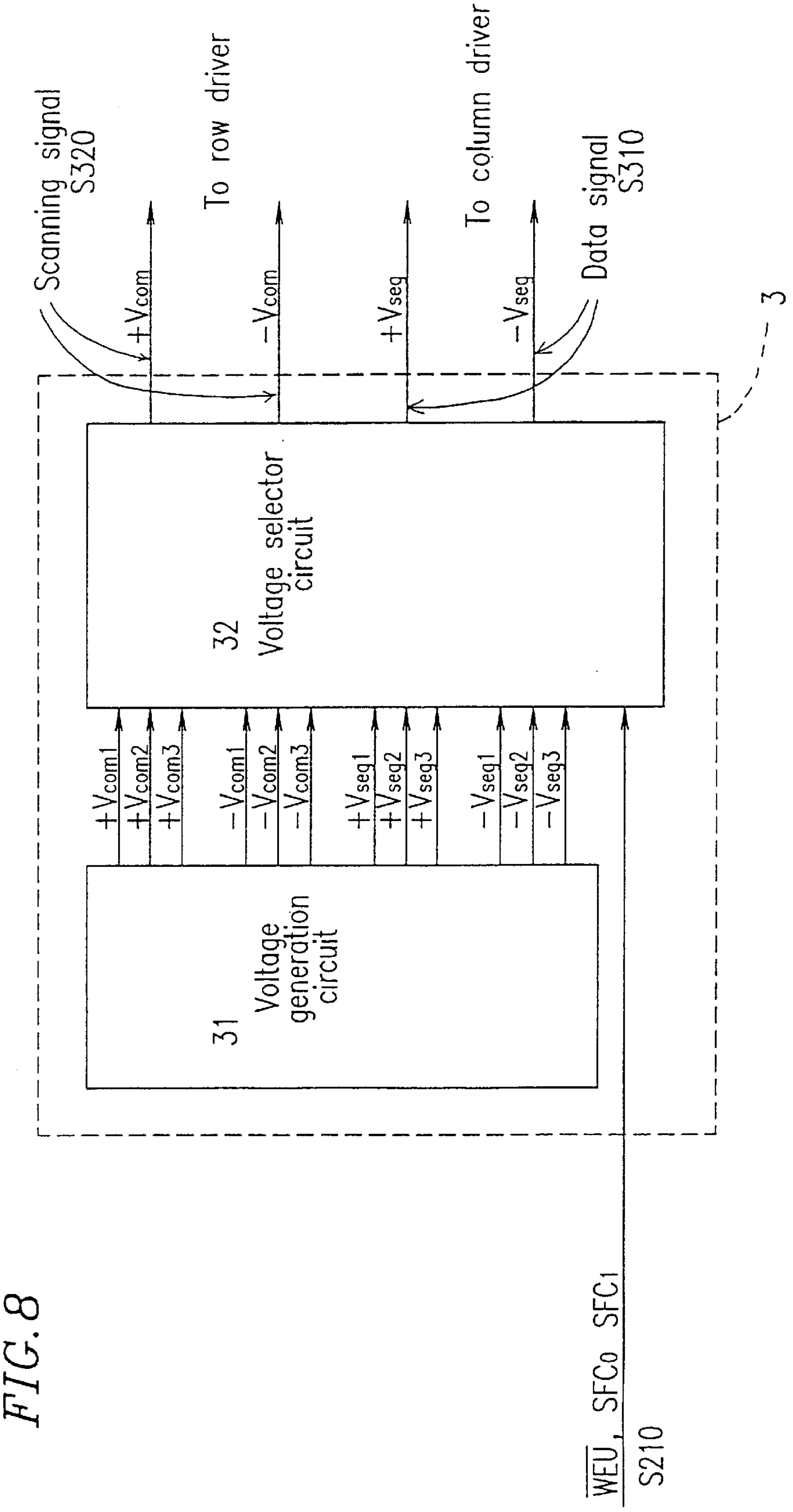
FIG. 8 is a schematic diagram illustrating a configuration of a pulse width control circuit in a liquid crystal display device according to an example of the present invention.

FIG. 8 shows the configuration of the pulse amplitude control circuit 3. As shown in FIG. 8, the pulse amplitude control circuit 3 includes the voltage generation circuit 31 and the voltage selector circuit 32. The voltage generation circuit 31 generates all the scanning signal voltages ($\pm V_{com1}$ to $\pm V_{com3}$) and data signal voltages ($\pm V_{seg1}$ to $\pm V_{seg3}$) which are shown in Table 1. The write signal $\overline{WEU}$ and the subframe count signals $SFC_0$ and $SFC_1$ output from the timing control circuit 2 are input to the voltage selector circuit 32. The voltage generation circuit 31 selects the scanning signal voltage and the data signal voltage to be used for each subframe based on Table 1, thus setting the voltage amplitude $\pm V_{com}$ of the scanning signal S320 and the voltage amplitude $\pm V_{seg}$ of the data signal. S310 to be applied to the group of row drivers 4 and the group of column drivers 5, respectively.

As described above, the duration and the voltage of the scanning signal S320 and the data signal S310 are set independently for each subframe, and the scanning signal S320 and the data signal S310 are applied to the liquid crystal panel 6 via the group of row drivers 4 and the group of column drivers 5, respectively, so that a certain number of gray-scale levels are obtained.

Figure 9:
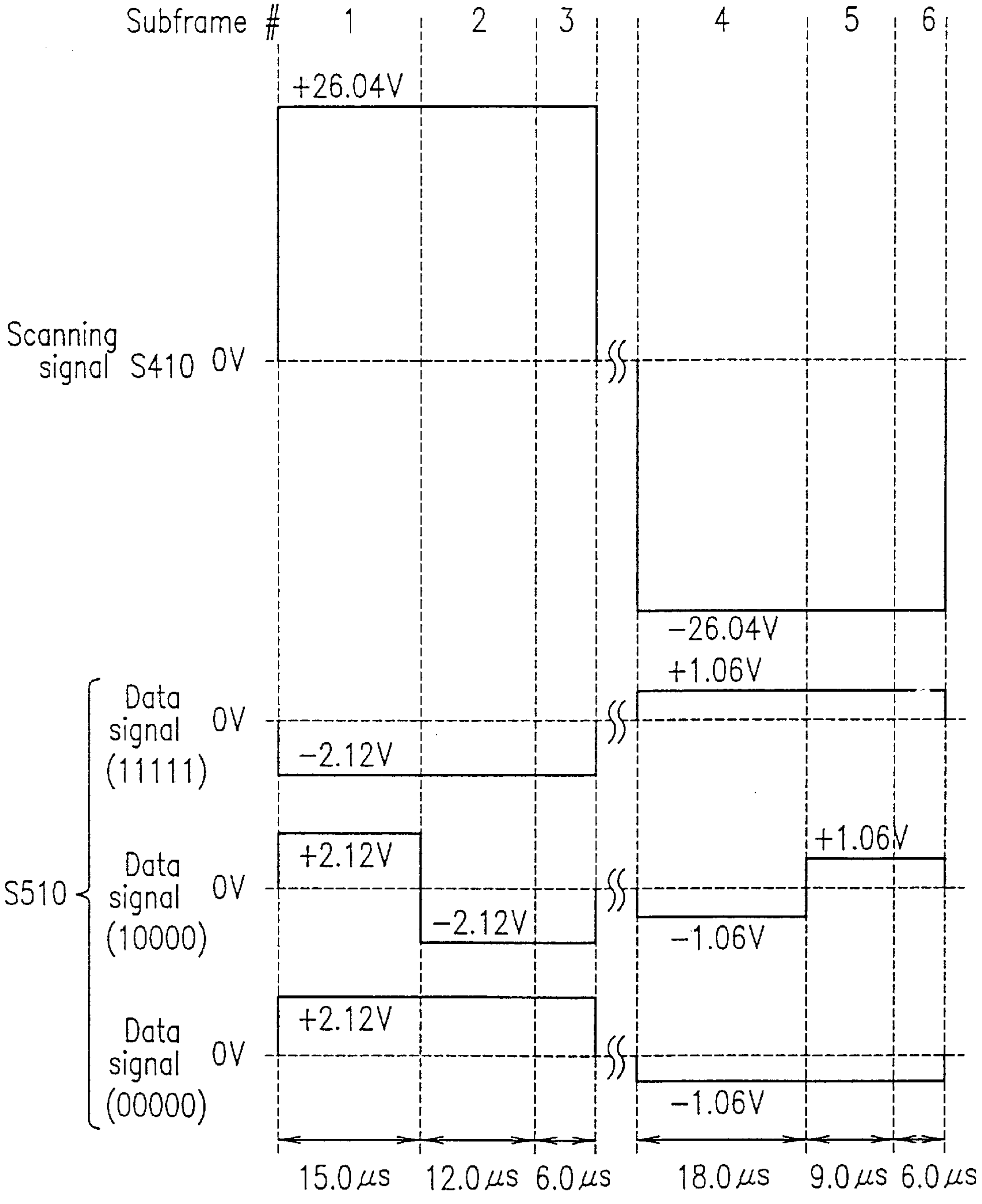
FIG. 9 is a diagram illustrating waveforms of a scanning signal and data signals applied to a liquid crystal panel in a liquid crystal display device according to an example of the present invention.

FIG. 9 shows waveforms of a scanning signal S410 and a data signal S510 to be applied to the liquid crystal panel 6. According to Table 1, a voltage signal of about ±26.04 V (for subframes #1 to #3) or about −26.04 V (for subframes #4 to #6) is applied as the scanning signal S410 during a selection period, while a voltage signal of about 0 V is applied for all the subframes during a non-selection period.

According to the binary display data S110, a voltage signal of about +2.12 V is applied as the data signal S510 for subframes #1 to #3, while a voltage signal of about +1.06 V is applied for subframes #4 to #6. Herein, it is assumed that the ON display voltage be about −2.12 V and the OFF display voltage be about +2.12 V for subframes #1 to #3, and the ON display voltage be about +1.06 V and the OFF display voltage be about −1.06 V for subframes #4 to #6.

In FIG. 9, bit values (11111), (00000) and (10000) of the data signal S510 correspond to waveforms representing ON display level, OFF display level, and an intermediate gray-scale level having a brightness in the middle between the ON and OFF states, respectively.

Figure 10:
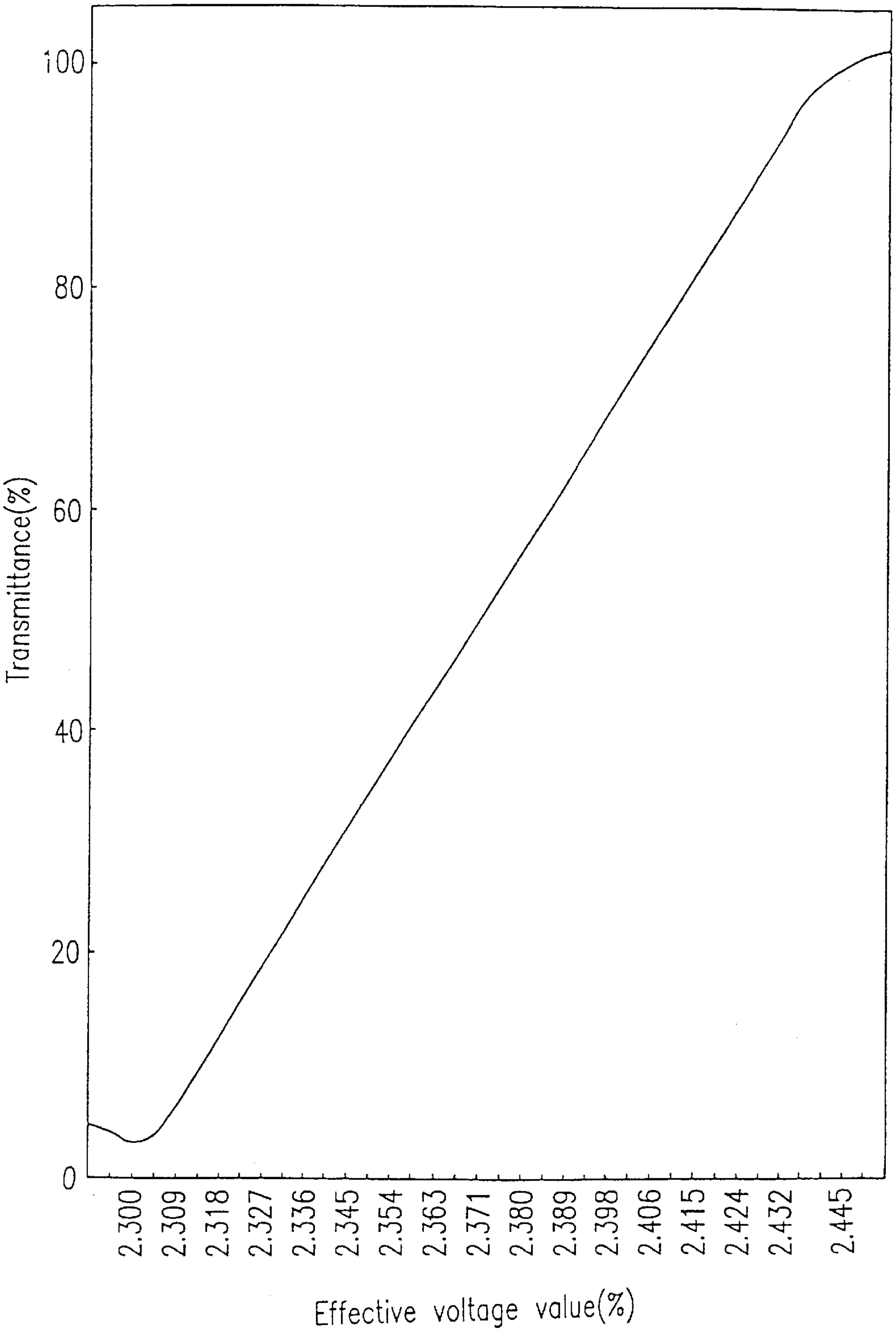
FIG. 10 shows a graph illustrating the relationship between the effective value of applied voltages and the transmission of a liquid crystal panel.

FIG. 10 shows the relationship between the effective value of an applied voltage and the transmission of the liquid crystal panel 6. As can be seen from FIG. 10, the transmission varies substantially linearly for 32 levels from the OFF voltage (about 2.300 V) to the ON voltage (about 2.445 V). That is, a high-quality gray-scale display is provided in the present example.

As described above, according to the liquid crystal display device and the method for driving the same according to Example 1 of the present invention, a gray-scale display is realized without significantly reducing the minimum subframe period. Thus, a high-quality gray-scale display can be conducted while suppressing flickers in the displayed images which would occur in the frame modulation method and the display non-uniformity which would occur in the pulse width modulation method without increasing the circuit scale in the display device so much as in the amplitude modulation method.

EXAMPLE 2

In Example 1 above, a liquid crystal display device employing the line-sequential driving method has been described. However, the present invention is capable of conducting a gray-scale display also with a liquid crystal display device employing the multiple line selection method or the active addressing method. In the present example, a liquid crystal display device 200 employing the multiple line selection method or the active addressing method will be described.

Figure 11:
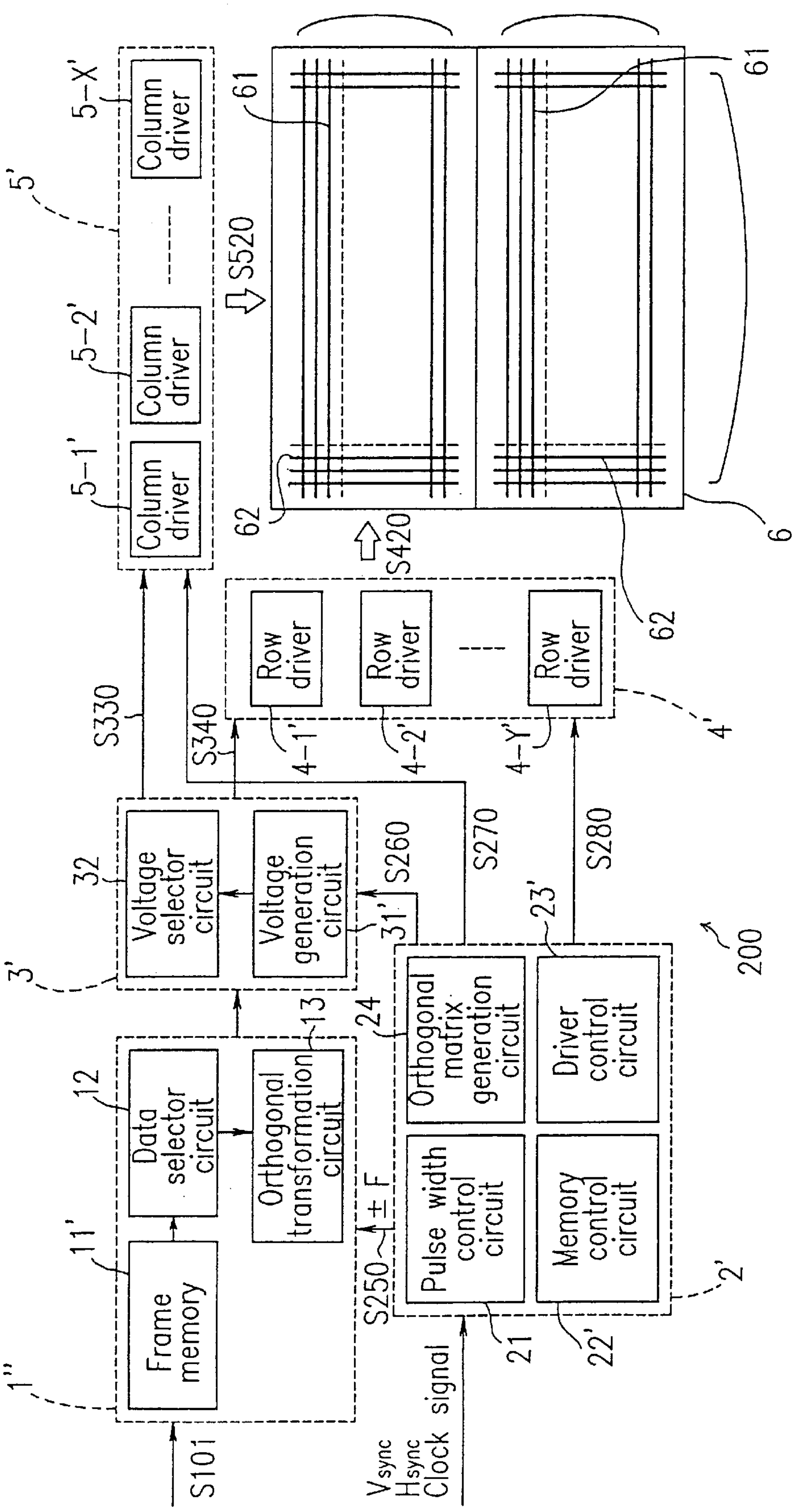
FIG. 11 is a schematic diagram for illustrating a liquid crystal display device and a method for driving the same according to another example of the present invention.

As shown in FIG. 11, the liquid crystal display device 200 includes a display data transformation circuit 1', a timing control circuit 2', a pulse amplitude control circuit 3', a group of row drivers 4', a group of column drivers 5', and the liquid crystal panel 6. As compared to the liquid crystal display device 100 described in Example 1, the display data transformation circuit 1' of the liquid crystal display device 200 further includes an orthogonal transformation circuit 13, and the timing control circuit 2' further includes an orthogonal matrix generation circuit 24. Moreover, other circuits (except for the liquid crystal panel 6) are also modified in accordance with the increased number of rows which are selected simultaneously.

Hereinafter, the configuration and the operations of the liquid crystal display device 200 will be described mainly with respect to the differences from Example 1. In this example, the number of simultaneously-selected lines is set to four, and a color liquid crystal panel similar to that in Example 1 is employed. Specifically, the liquid crystal panel 6 has 240 row electrodes (N=240) for each display area, 1920 column electrodes (M=1920=640×RGB), a threshold voltage of about 2.3 V, and a response rate (−r+−d) of about 130 ms. A gray-scale display with 32 levels effected on the upper display area will be explained in the following description. However, it is understood that a gray-scale display is similarly conducted on the lower display area.

In the display data transformation circuit 1' of the liquid crystal display device 200, the input image data S101 is serially input and written to a frame memory 11' row by row so that the image data for one screen (240 rows×1920 columns for the upper display area) is written to the frame memory 11'. As the liquid crystal display device 200 employs the method in which a plurality of lines are simultaneously selected, the image data for 4 rows×1920 columns, which corresponds to the four simultaneously-selected row electrodes 61, is read out for one column at a time. The read-out image data is processed as in Example 1 by the data selector circuit 12 and is output to the orthogonal transformation circuit 13 as the binary display data S120.

The vertical synchronization signal, the horizontal synchronization signal, and the clock signal are input to the timing control circuit 2'. The timing control circuit 2' is responsible for timing controls of the entire system. The timing control circuit 2' includes the pulse width control circuit 21 for setting a period independently for each subframe, a memory control circuit 22', a driver control circuit 23' which generates timing signals for operating the group of row drivers 4' and the group of column drivers 5', and the orthogonal matrix generation circuit 24.

The pulse width control circuit 21 and the memory control circuit 22' output various control signals indicated by S250 for controlling the operation of the display data transformation circuit 1". Further, the orthogonal matrix generation circuit 24 generates an orthogonal matrix ±F having, for example, 4 rows and 4 columns such as expressed by Expression 13 below, and outputs the orthogonal matrix to the orthogonal transformation circuit 13.

(Expression 13)

$$\pm F = \pm \begin{bmatrix} 1 & 1 & 1 & 1 \\ 1 & 1 & -1 & -1 \\ 1 & -1 & -1 & 1 \\ 1 & -1 & 1 & -1 \end{bmatrix} \tag{13}$$

The orthogonal transformation circuit 13 performs an orthogonal transformation for the binary display data S120 from the data selector circuit 12 based on the orthogonal matrix ±F, and outputs the resultant data as transformed display data S130.

The pulse amplitude control circuit 3' includes a voltage generation circuit 31' and the voltage selector circuit 32. The pulse amplitude control circuit 3' receives the transformed display data S130 output from the display data transformation circuit 1", and sets a voltage value independently for each subframe based on the value of the transformed display data S130. The voltage values which are set as above are applied to the column electrodes 62 via the column drivers 5-1', 5-2', . . . , 5-X'.

Typically when the multiple line selection method or the active addressing method is employed, the number of data signal voltage levels, which are set independently for each subframe, varies according to the number of lines which are selected simultaneously. When the number of the simultaneously-selected lines is L (L=4 in this example), (L+1) data signal voltage levels are required for each subframe in order to display the original binary display data S120 which corresponds to the gray-scale bits of the input image data on the liquid crystal panel 6. Based on the result of the orthogonal transformation, one voltage value selected from the (L+1) levels is output for each subframe.

Based on the orthogonal matrix ±F used for the orthogonal transformation, L (=4) scanning signals are output from the row drivers 4-1', 4-2', . . . , 4-Y' in synchronization with the transformed display data S130.

Thus, an inverse transformation is performed for the transformed display data S130 on the liquid crystal panel 6, whereby displaying the original image data is displayed with a gray-scale level according to the binary display data S120 which corresponds to the gray-scale bits.

Table 3 below shows an example of the period (μs) and the voltage amplitudes (V) for each subframe in the case where 32 gray-scale levels are effected with the liquid crystal display device 200.

TABLE 3

| Subframe # | 1 | 2 | 3 | 4 | 5 | 6 |
|---|---|---|---|---|---|---|
| Period (μs) | 15.0 | 12.0 | 6.0 | 18.0 | 9.0 | 6.0 |
| Scanning signal voltage (V) | ±13.02 | ±13.02 | ±13.02 | ±13.02 | ±13.02 | ±13.02 |
| Data signal voltage (V) (5 levels are needed for 4-line-selection drive) | ±4.24<br>±2.12<br>0 | ±4.24<br>±2.12<br>0 | ±4.24<br>±2.12<br>0 | ±2.12<br>±1.06<br>0 | ±2.12<br>±1.06<br>0 | ±2.12<br>±1.06<br>0 |
| ON display effective voltage (V) | 2.789 | 2.789 | 2.789 | 2.044 | 2.044 | 2.044 |
| OFF display effective voltage (V) | 2.619 | 2.619 | 2.619 | 1.928 | 1.928 | 1.928 |

| Input Upper → data → Lower | | | | | Binary display data for each subframe | | | | | | Effective voltage (V) |
|---|---|---|---|---|---|---|---|---|---|---|---|
| 1 | 1 | 1 | 1 | 1 | ON | ON | ON | ON | ON | ON | 2.445 |
| 1 | 1 | 1 | 1 | 0 | ON | ON | ON | ON | ON | OFF | 2.437 |
| 1 | 1 | 1 | 0 | 1 | ON | ON | ON | ON | OFF | ON | 2.432 |
| 1 | 1 | 1 | 0 | 0 | ON | ON | OFF | ON | ON | ON | 2.428 |
| 1 | 1 | 0 | 1 | 1 | ON | ON | ON | ON | OFF | OFF | 2.424 |
| 1 | 1 | 0 | 1 | 0 | ON | ON | ON | OFF | ON | ON | 2.419 |
| 1 | 1 | 0 | 0 | 1 | ON | ON | OFF | ON | OFF | ON | 2.415 |
| 1 | 1 | 0 | 0 | 0 | ON | ON | ON | OFF | ON | OFF | 2.411 |
| 1 | 0 | 1 | 1 | 1 | ON | ON | ON | OFF | OFF | ON | 2.406 |
| 1 | 0 | 1 | 1 | 0 | ON | ON | OFF | OFF | ON | ON | 2.402 |
| 1 | 0 | 1 | 0 | 1 | ON | ON | ON | OFF | OFF | OFF | 2.398 |
| 1 | 0 | 1 | 0 | 0 | ON | OFF | OFF | ON | ON | ON | 2.393 |
| 1 | 0 | 0 | 1 | 1 | ON | ON | OFF | OFF | OFF | ON | 2.389 |
| 1 | 0 | 0 | 1 | 0 | ON | OFF | OFF | ON | ON | OFF | 2.385 |
| 1 | 0 | 0 | 0 | 1 | ON | ON | OFF | OFF | OFF | OFF | 2.380 |
| 1 | 0 | 0 | 0 | 0 | OFF | ON | ON | OFF | ON | ON | 2.376 |
| 0 | 1 | 1 | 1 | 1 | ON | OFF | OFF | ON | OFF | OFF | 2.371 |
| 0 | 1 | 1 | 1 | 0 | OFF | OFF | ON | ON | ON | ON | 2.367 |
| 0 | 1 | 1 | 0 | 1 | OFF | ON | ON | OFF | OFF | ON | 2.363 |
| 0 | 1 | 1 | 0 | 0 | OFF | OFF | ON | ON | ON | OFF | 2.358 |
| 0 | 1 | 0 | 1 | 1 | OFF | ON | ON | OFF | OFF | OFF | 2.354 |
| 0 | 1 | 0 | 1 | 0 | OFF | OFF | OFF | ON | ON | ON | 2.349 |
| 0 | 1 | 0 | 0 | 1 | OFF | OFF | ON | ON | OFF | OFF | 2.345 |
| 0 | 1 | 0 | 0 | 0 | OFF | OFF | OFF | ON | ON | OFF | 2.340 |
| 0 | 0 | 1 | 1 | 1 | OFF | OFF | OFF | ON | OFF | ON | 2.336 |
| 0 | 0 | 1 | 1 | 0 | OFF | OFF | ON | OFF | ON | OFF | 2.331 |
| 0 | 0 | 1 | 0 | 1 | OFF | OFF | OFF | ON | OFF | OFF | 2.327 |
| 0 | 0 | 1 | 0 | 0 | OFF | OFF | OFF | OFF | ON | ON | 2.322 |
| 0 | 0 | 0 | 1 | 1 | OFF | OFF | ON | OFF | OFF | OFF | 2.318 |
| 0 | 0 | 0 | 1 | 0 | OFF | OFF | OFF | OFF | ON | OFF | 2.313 |
| 0 | 0 | 0 | 0 | 1 | OFF | OFF | OFF | OFF | OFF | ON | 2.309 |
| 0 | 0 | 0 | 0 | 0 | OFF | OFF | OFF | OFF | OFF | OFF | 2.300 |

According to the example of Table 3, 6 subframes are provided for 5-bit input image data S101 ($2^5$=32 gray-scale levels). As in Example 1, the 5-bit image data is first transformed into binary display data (6-bit data) S120 having a binary value (ON or OFF) for each subframe based on the bit values of the image data. Then, based on the binary data for each subframe and the result of the orthogonal transformation, one of the display voltages (5 levels) which are set independently for each subframe is selectively applied during the subframe. The "effective voltage" column in Table 3 shows effective voltage values obtained for the 6-subframe period.

Herein, the waveforms of the binary display data S120 and the corresponding effective voltage values are similar to those of the binary display data S110 shown in FIG. 4.

Figures 12A, 12B:
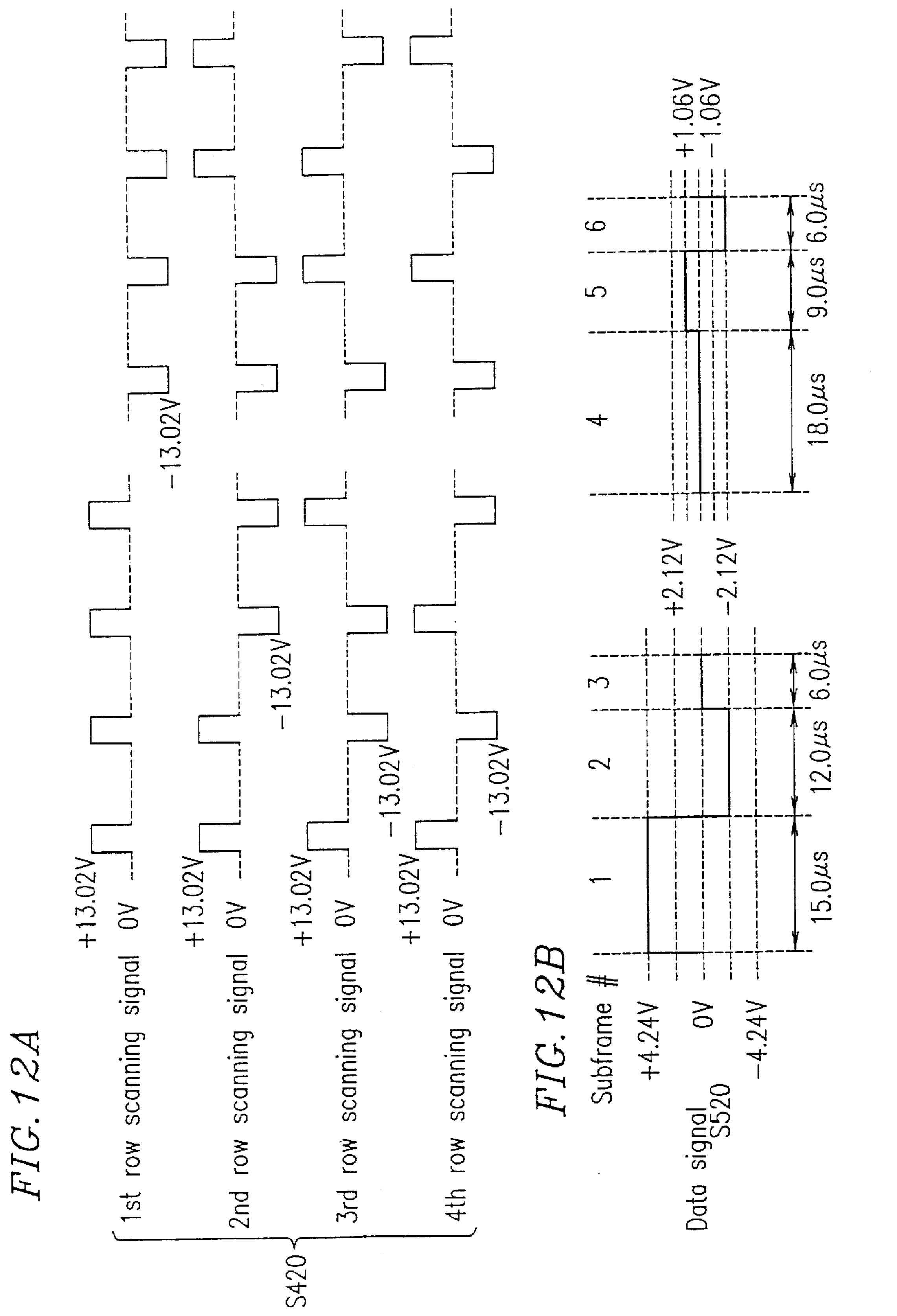
FIGS. 12A and 12B are diagrams illustrating waveforms of scanning signals and a data signal applied to a liquid crystal panel in a liquid crystal display device according to another example of the present invention.

FIGS. 12A and 12B show waveforms of scanning signals S420 and data signals S520 which are applied to the liquid crystal panel 6. According to Table 3, the scanning signal S420 is applied with a voltage of about ±13.02 V (during a selection period) or with a voltage of about 0 V (during a non-selection period) for all subframe periods. As can be seen from FIG. 12A and Expression 9, pulse signals based on the orthogonal matrix ±F are applied to the simultaneously-selected four scanning lines.

As shown in FIG. 12B, based on the transformed display data S130, the data signal S520 is applied with one of voltages of about ±4.24 V, about ±2.12 V and about 0 V for subframes #1 to #3 and with one of voltages of about ±2.12 V, about ±1.06 V and about 0 V for subframes #4 to #6.

As described above, according to the liquid crystal display device and the method for driving the same according to Example 2 of the present invention, a high-quality gray-scale display can be conducted while flickers in the displayed images, which would occur in the frame modulation method, and the display non-uniformity, which would occur in the pulse width modulation method, are suppressed without increasing the circuit scale in the display device so much as in the amplitude modulation method.

EXAMPLE 3

In Example 3, the present invention is applied to the frame modulation method. As already mentioned in the description of the basic principle of the present invention, all subframe periods $T_k$ are set to an equal value of a horizontal scanning period $T_{Hsync}$ in the frame modulation method. The voltage value $V_k$ for the subframe period $T_k$ is set independently for each horizontal scanning periods in a frame according to the gray-scale level to be effected on a pixel.

The configuration of the liquid crystal display device according to the present example is substantially the same as those of the liquid crystal display device 100 of Example 1 (the line-sequential driving method) and the liquid crystal display device 200 of Example 2 (the multiple line selection method or the active addressing method). In the present example, since all the subframe periods $T_k$ are set to an equal value, the pulse width control circuit 21 in the timing control circuit 2 or 2' can be eliminated so as to further reduce the circuit scale. Hereinafter, the present example will be described for the case where the line-sequential driving method is employed.

Figure 13:
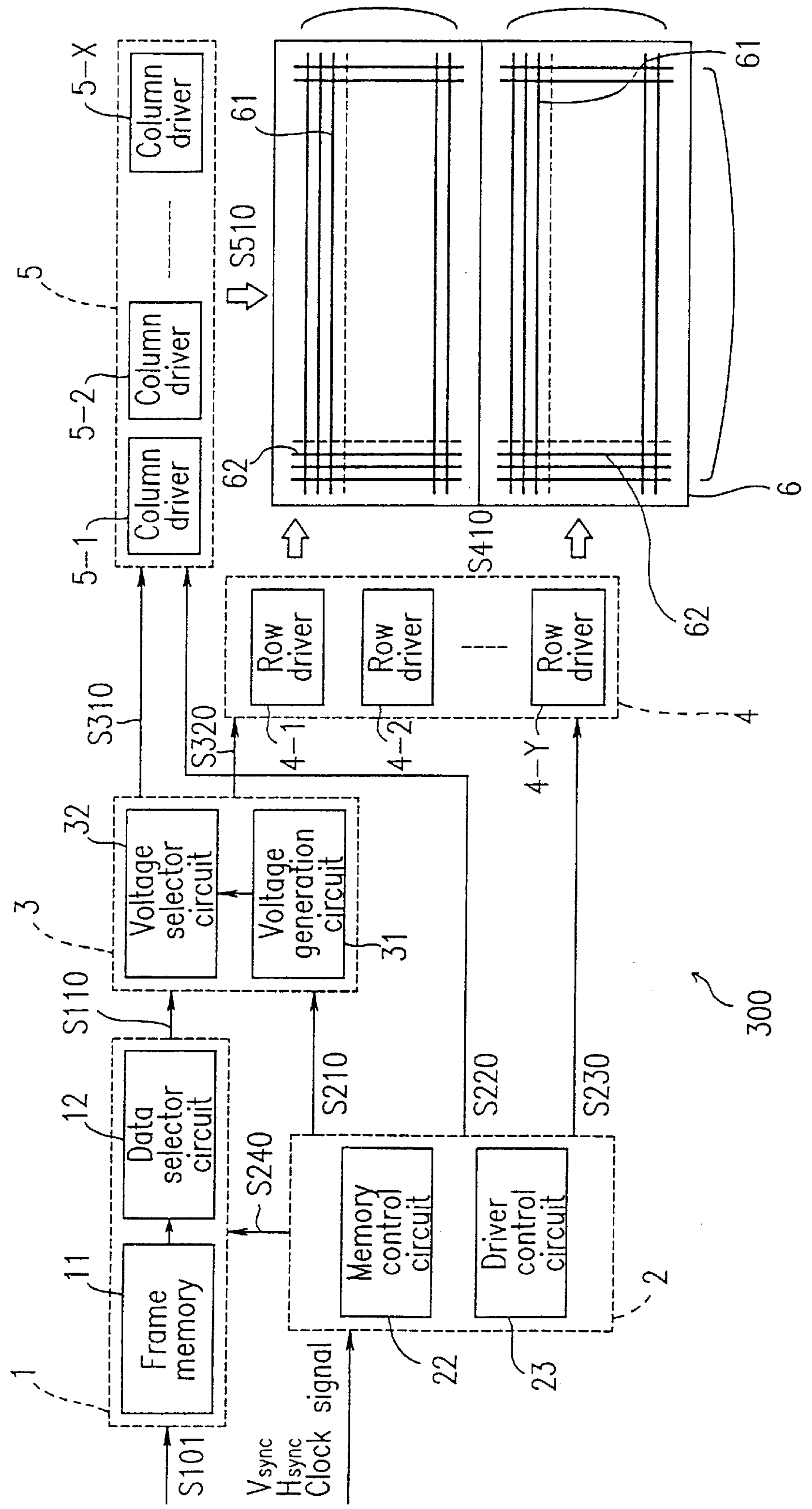
FIG. 13 is a schematic diagram for illustrating a liquid crystal display device and a method for driving the same according to still another example of the present invention.

FIG. 13 shows a configuration of a liquid crystal display device 300 where the present invention is applied to the frame modulation method. As shown in FIG. 13, the display data transformation circuit 1 includes the frame memory 11 and the data selector circuit 12. The timing control circuit 2 includes the memory control circuit 22 and the driver control circuit 23. The pulse width control circuit 21 is not needed in the present example. Other than this, the configuration of the liquid crystal display device 300 is the same as that of the liquid crystal display device 100.

In the present example, the image data S101 is input to the display data transformation circuit 1 for one frame at a time. For a plurality of frames, there are provided subframes of a number equal to or greater than the number of gray-scale bits of the input image data according to the number of gray-scale levels to be effected. For example, when a number n subframes are provided, the frame memory 11 receives the image data for one frame and holds the image data for an n-frame period. The image data for one frame is divided and displayed in the corresponding horizontal scanning periods (subframes) in the n-frame period.

The data selector circuit 12 transforms the input image data S101 (gray-scale bits) for one frame into the n-bit binary display data S110 as in Example 1. The number n of bits of the binary display data S110 are set to be equal to or more than the number of gray-scale bits of the input image data S101 as described above. As in Example 1, each bit of the binary display data S110 corresponds to a subframe. Herein, the subframe period $T_k$ is a constant value (the horizontal scanning period $T_{Hsync}$) The pulse amplitude control circuit 3 receives the binary display data S110 from the display data transformation circuit 1, and sets a voltage value independently for each subframe. As in Example 1, the transformed signal is applied to the liquid crystal panel 6 via the group of column drivers 5 and the group of row drivers 4.

Since a plurality of frames are time-averaged in the frame modulation method, the binary display data S110 for one frame (i.e., having n bits) is displayed on the liquid crystal panel 6 using n frames. The period T during which a, display signal voltage is applied to a pixel is represented by $n \times T_{Hsync}$.

Also in the present example, the display data transformation circuit 1 may be arranged so that the binary display data S110 is written to the frame memory 11, but not the input image data S101. However, since the subframe period is constant in the frame modulation method, the number of subframes increases as compared to the pulse width modulation method. In this case, by transforming the input image data S101 into the binary display data S110 before it is read out from or written into the frame memory 11, the required capacity of the frame memory 11 increases adversely.

Hereinafter, setting a respective voltage value for each subframe will be described in detail when the present invention is applied to the frame modulation method. Particularly, $2^5=32$ gray-scale levels are effected with 8 subframes for the 5-bit input image data As in Example 1, exact effective voltage values can be calculated from the subframe periods $T_k(=T_{Hsync}=\text{const.})$ and the voltage values $V_k$ for the subframe periods based on Expression 2 above. In practice, however, the effective voltage values can be set by using a more simplified method.

The subframe periods $T_k$ ($\mu$s) and the data signal voltage values $V_k$ (V) for the subframe periods $T_k$ (herein, k=1 to 8) are set in such proportions as shown by the following Expressions 14 and 15, respectively.

(Expression 14)

$$T_1:T_2:T_3:T_4:T_5:T_6:T_7:T_8=1:1:1:1:1:1:1:1 \quad (14)$$

(Expression 15)

$$V_1:V_2:V_3:V_4:V_5:V_6:V_7:V_8=6:5:3:2:6:5:4:2 \quad (15)$$

With the proportional constants shown in Expressions 14 and 15, binary display states $H_k$ (ON) and $L_k$ (OFF) for each frame period $T_k$ can be expressed as Expression 16 below.

(Expression 16)

$$H_1=T_1\times V_1\times 1=6,\ L_1=T_1\times V_1\times 0=0$$

$$H_2=T_2\times V_2\times 1=5,\ L_2=T_2\times V_2\times 0=0$$

$$H_3=T_3\times V_3\times 1=3,\ L_3=T_3\times V_3\times 0=0$$

$$H_4=T_4\times V_4\times 1=2,\ L_4=T_4\times V_4\times 0=0$$

$$H_5=T_5\times V_5\times 1=6,\ L_5=T_5\times V_5\times 0=0$$

$$H_6=T_6\times V_6\times 1=5,\ L_6=T_6\times V_6\times 0=0$$

$$H_7=T_7\times V_7\times 1=4,\ L_7=T_7\times V_7\times 0=0$$

$$H_8=T_8\times V_8\times 1=2,\ L_8=T_8\times V_8\times 0=0 \quad (16)$$

Accordingly, for an 8-frame period, which is to be time-averaged, including 8 subframes, 32 integer values as shown in Expression 17 below can be obtained according to the binary display data (8-bit) representing the gray-scale levels (5-bit) of the input data.

(Expression 17)

$$H_1+H_2+H_3+H_4+H_5+H_6+H_7+H_8=33$$

$$H_1+H_2+H_3+H_4+H_5+H_6+H_7+L_8=31$$

$$H_1+H_2+H_3+L_4+H_5+H_6+H_7+H_8=30$$

- - -

$$L_1+L_2+H_3+L_4+L_5+L_6+H_7+L_8=3$$

$$L_1+L_2+L_3+L_4+L_5+L_6+H_7+H_8=2$$

$$L_1+L_2+L_3+L_4+L_5+L_6+L_7+L_8=0 \quad (17)$$

Although two values "1" and "32" are not available as can be seen from Expression 17, this would not be a problem in conducting a gray-scale display in practice since these values can be substituted by "0" and "33", respectively.

In this example, the scanning signal voltage value is fixed while the data signal voltage value is varied. However, it is also applicable to fix the data signal voltage value while the scanning signal voltage value is varied. However, it is difficult to vary both the scanning signal voltage value and the data signal voltage value in the above simplified method. In such a case, the effective voltage values are calculated based on Expression 2 above.

Further, according to the present example, the number n of frames to be time-averaged in order to effect a gray-scale level can be reduced as compared to the conventional techniques. For example, by setting the data signal voltage to about ±2.12 V for odd-numbered frames and about ±1.06 V for even-numbered frames, and by setting the scanning signal voltage to about ±26.04 V (constant), 4 gray-scale levels can be effected using two frames (n=2). On the other hand, according to the conventional frame modulation method, only three grayscale levels can be effected using two frames.

In the liquid crystal display device 300, the input image data S101 for one frame written to the frame memory 11 is held for the number n of frames to be time-averaged. That is, the same input image data S101 is held for an n-frame period. There is no problem when displaying substantially static images by time-averaging n frames. However, in order to display motion pictures, when the number n of frames to be time-averaged increases as the number of gray-scale bits of the input image data increases, the input image data S101 may be changed within the n-frame period. Specifically, when the cycle at which the input image data S101 is changed is shorter than the n-frame period, there is data missing in the successive input image data so that images are displayed with some missing frames.

Figure 14:
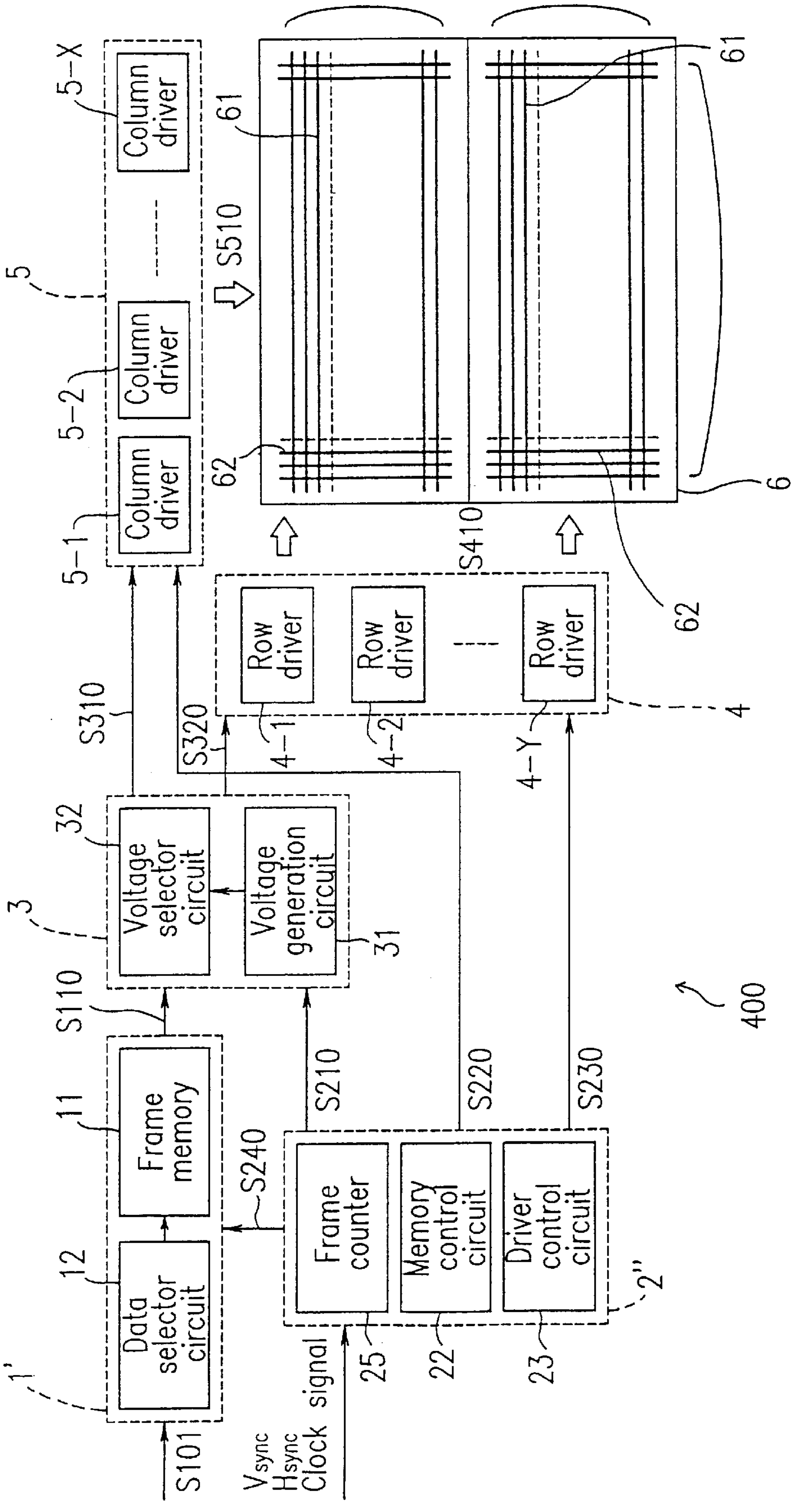
FIG. 14 is a schematic diagram for illustrating a liquid crystal display device and a method for driving the same according to still another example of the present invention.

FIG. 14 shows a configuration of a liquid crystal display device 400 which can avoid these problems and which can display motion pictures where input image data is changed every frame, for example. As shown in FIG. 14, in the liquid crystal display device 400, a timing control circuit 2" includes the memory control circuit 22, driver control circuit 23, and a frame counter 25. As in the case where motion pictures are displayed by using an ordinary frame modulation method, which one of the ON display or the OFF display is effected in the current frame (i.e., the current subframe period) is determined based on the output values of the counter 25 and the value (gray-scale level) of the input image data S101.

As shown in FIG. 14, when output image data is changed for each frame, th e input image data S101 which has been input to the display data transformation circuit 1' is first transformed into binary data in the data selector circuit 12 (the configuration of the display data transformation circuit 1' becomes the same as that shown in FIG. 7). For example, 5-bit gray-scale data as the input image data S101 is input in the single-scanning mode. When the input image data in the single-scanning mode is displayed on a liquid crystal panel in the dual-scanning mode, two scanning operations are performed on the liquid crystal panel in one frame of the input image data. Since the input image data is changed for each frame, 2-bit data will be required for a single-frame period. Accordingly, the data selector circuit 12 outputs 2-bit binary display data. As in the case described in FIG. 7, one of the tow bits is directly output to the pulse amplitude control circuit 3. The other one bit is first written to the frame memory 11 and then output to the pulse amplitude control circuit 3 in the following subframe period (the horizontal scanning period).

As described above, according to the present invention, for the image display data for one frame, there are provided subframes of a number equal to or greater than the number of bits (the bit length of grayscale data) representing the gray-scale level for each horizontal period, and a voltage amplitude is set independently for each subframe. Due to such a structure, a certain number of gray-scale levels can be effected using a lesser number of subframes as compared to the conventional frame modulation method. As a result, flickers in the displayed images which would occur in the frame modulation method can be suppressed.

EXAMPLE 4

In Example 4, the present invention is applied to the frame modulation method. As already mentioned in the description of the basic principle of the present invention, all subframe periods $T_k$ are set to an equal value of a horizontal scanning period $T_{Hsync}$ in the frame modulation method. The voltage value $V_k$ for the subframe period $T_k$ is set independently for each horizontal scanning periods in a frame according to the gray-scale level to be effected on a pixel.

In Example 3, a liquid crystal display device employing the line-sequential driving method has been described. In the present example, liquid crystal display device employing the multiple line selection method or the active addressing method will be described.

Figure 15:
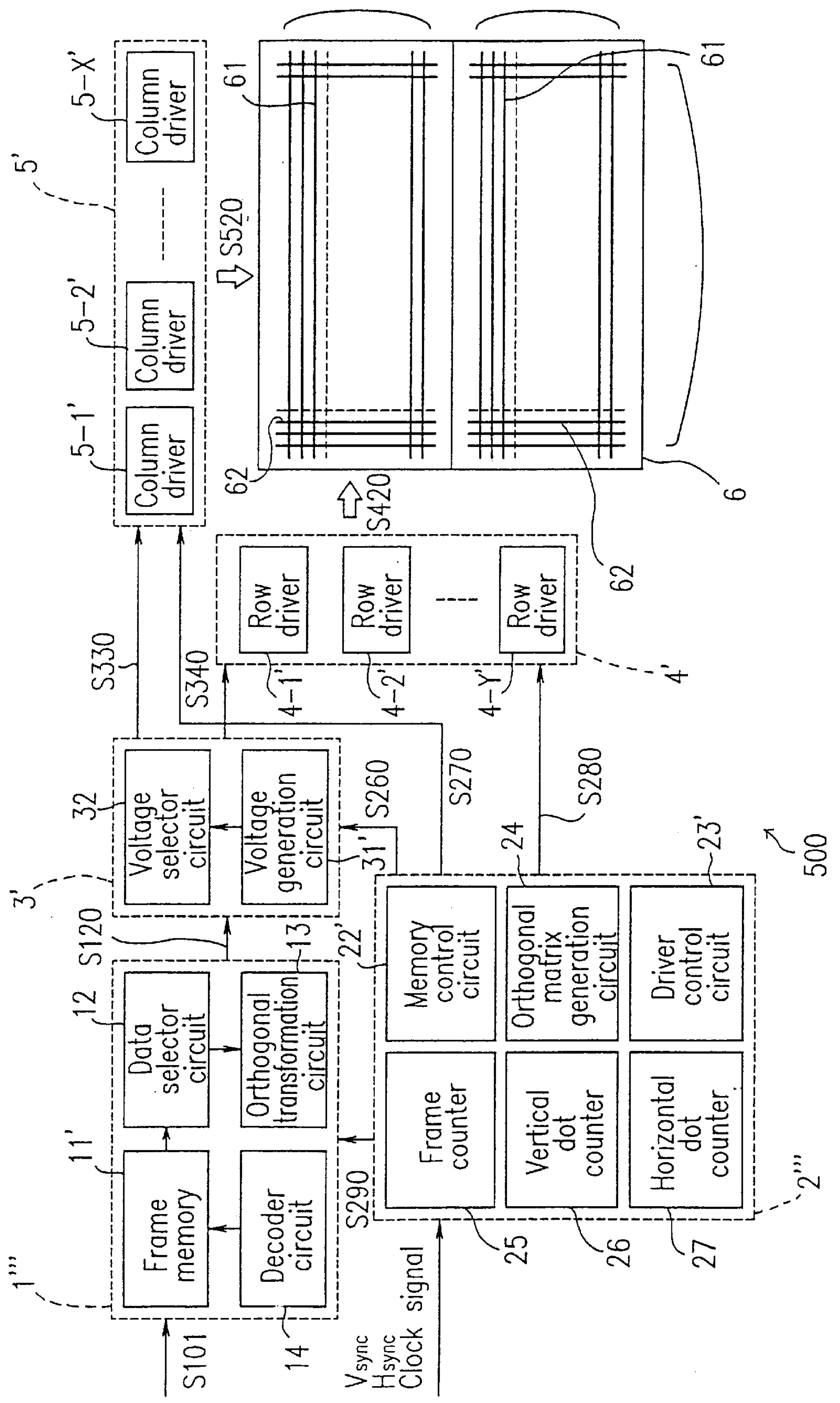
FIG. 15 is a schematic diagram for illustrating a liquid crystal display device and a method for driving the same according to still another example of the present invention.

FIG. 15 shows a configuration of a liquid crystal display device 500 when the present invention is applied to the frame modulation method while the multiple line selection method or the active addressing method is employed. The liquid crystal display device 500 includes a display data transformation circuit 1'", a timing control circuit 2'", the pulse amplitude control circuit 3', the group of row drivers 4', the group of column drivers 5', and the liquid crystal panel 6.

Hereinafter, the configuration and the operation of the liquid crystal display device 500 will be described. Herein, the number of simultaneously-selected lines is set to four, and a color liquid crystal panel similar to that in Examples 1 to 3 is employed. Specifically, the liquid crystal panel 6 has 240 row electrodes (N=240) for each display area, 1920 column electrodes (M=1920=640×RGB), a threshold voltage of about 2.3 V, and a response rate ($\tau_r+\tau_d$) of about 130 ms. A gray-scale display with 32 levels effected on the upper display area will be explained in the following description. However, it is understood that a gray-scale display is similarly conducted on the lower display area.

Typically in the conventional frame modulation method, some 16 frames are set for conducting a grayscale display with 16 levels. In such a case, flickers may occur over the entire display area when all the pixels are lighted simultaneously. A method which is widely employed for solving such a problem is to light pixels at different timings so that flickers, which would occur over the entire display area, only appear in minute regions scattered over the entire display area. In order to change the phase of the pixel to be lighted for each frame, a frame counter, a vertical dot counter, and a horizontal dot counter are required. Moreover, a decoder circuit will also be required for receiving the output values of these counters and the input image data to determine a sequence of ON states and OFF states for each pixel for a frame.

In the present example, 32 gray-scale levels are effected with, for example, 16 frames. When 16 frames are provided, flickers may occur over the entire display area as all the pixels are lighted simultaneously as in the conventional frame modulation method. To prevent such a problem, as in the conventional techniques, pixels are lighted at different timings so that flickers which would occur over the entire display area only appear in minute regions scattered over the entire display area. In order to change the phase of pixels to be lighted for each frame, the frame counter 25, a vertical dot counter 26, and a horizontal dot counter 27 are additionally provided to the timing control circuit 2'''. Moreover, a decoder circuit 14 will also be provided to the display data transformation circuit 1''' for determining a sequence of ON states and OFF states for each pixel for each frame with the output values of these counters and the input image data S101 as input signals.

As described in Example 3, when displaying motion pictures by using the frame modulation method, as the number n of frames to be averaged increases along with the increased number of the gray-scale bits of the input image data, the input image data S101 may change within an n-frame period. Specifically, when the cycle at which the input image data S101 is changed is shorter than the n-frame period, there is data missing in the input image data, thereby displaying images with some missing frames. The liquid crystal display device 500 is configured so as to avoid such problems, and can be used for displaying motion pictures where the input image data is changed, for example, for each frame.

Figure 16:
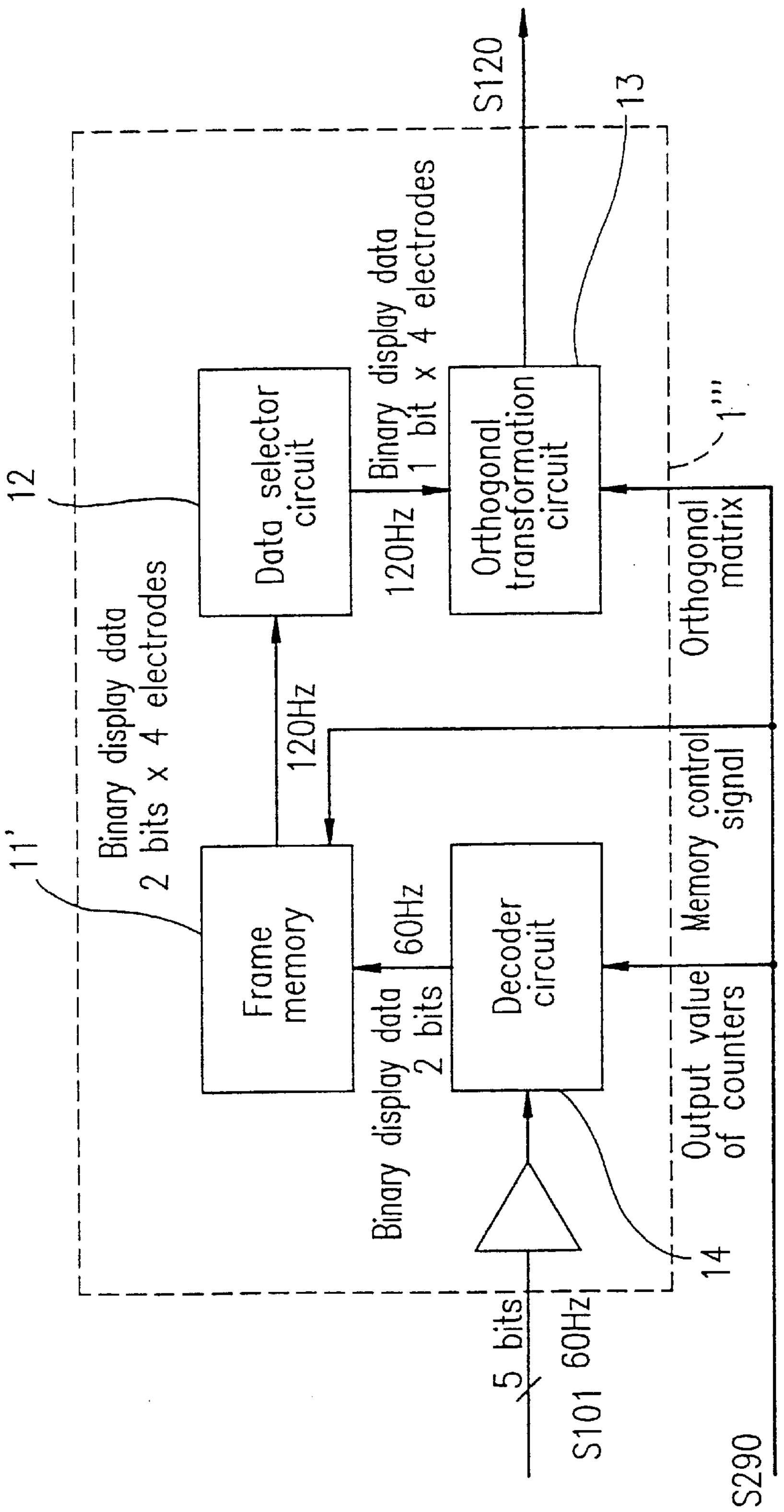
FIG. 16 is a schematic diagram illustrating a configuration of a display data transformation circuit in a liquid crystal display device according to still another example of the present invention.

FIG. 16 shows a configuration of the display data transformation circuit 1 As shown in FIG. 16, the image data S101 input to the display data transformation circuit 1''' is once input to the decoder circuit 14. Simultaneously, the timing control circuit 2''' outputs the output values of the frame counter 25, vertical dot counter 26, and horizontal dot counter 27. The decoder circuit 14 outputs 2-bit binary display data based on the sequence. Herein, the image data S101 is input as 5-bit gray-scale data in the single-scanning mode. When data input in the single-scanning mode is displayed in the dual-scanning mode, two scanning operations are performed on the liquid crystal panel in one frame of the input image data. Therefore, two bits of data are required for a single-frame period. Accordingly, the decoder circuit 14 outputs two bits of the binary display data.

Then, the 2-bit binary display data is written to the frame memory 11'. Since the liquid crystal display device 500 is driven by the 4-line-selection driving method, the binary data of 4 rows×1920 columns, which correspond to the simultaneously-selected four row electrodes 61, is read out for one column at a time. The data selector circuit 12 selects one bit of data to be displayed for the frame from the read-out 2-bit data and outputs the selected bit of data to the orthogonal transformation circuit 13.

A vertical synchronization signal, a horizontal synchronization signal, and a clock signal are input to the timing control circuit 2'''. Receiving these signals, the timing control circuit 2''' is responsible for timing controls of the entire system. The timing control circuit 2''' includes the memory control circuit 221, the driver control circuit 23' which generates timing signals for operating the group of row drivers 4 and the group of column drivers 5, and the orthogonal matrix generation circuit 24. The timing control circuit 240 '' further includes the frame counter 25, the vertical dot counter 26 and the horizontal dot counter 27 additionally provided thereto as described above. In the present example, the pulse width control circuit 21 is eliminated since all the subframe periods $T_k$ are set to an equal value.

The memory control circuit 22' and the counters 25 to 27 output the various control signals indicated by S250 for controlling the operation of the display data transformation circuit 1'''. The orthogonal matrix generation circuit 24 generates an orthogonal matrix ±F having, for example, 4 rows and 4 columns such as that described in Example 2, and outputs the orthogonal matrix to the orthogonal transformation circuit 13 of the display data transformation circuit 1'''. The orthogonal transformation circuit 13 performs an orthogonal transformation for the binary display data S120 from the data selector circuit 12 based on the orthogonal matrix ±F, and outputs the resultant data as the transformed display data S130.

The pulse amplitude control circuit 3' includes the voltage generation circuit 31' and the voltage selector circuit as in Example 2. The pulse amplitude control circuit 3' receives the transformed display data S130 output from the display data transformation circuit 1''', and sets a voltage value independently for each subframe based on the value of the transformed display data S130. The voltage values which are set as above are applied to the column electrodes 62 via the column drivers 5-1', 5-2', . . . , 5-X'.

Based on the orthogonal matrix ±F used for the orthogonal transformation, scanning signals for four scanning lines are output from the row drivers 4-1', 4-2', . . . , 4-Y' in synchronization with the transformed display data S130.

Thus, an inverse transformation is performed for the transformed display data S130 on the liquid crystal panel 6, thereby displaying the original image data.

Hereinafter, how a voltage value is set for each subframe will be described in detail. Particularly, 32 gray-scale levels are to be effected with 16 subframes for the 5-bit input image data S101. Whereas four different amplitudes are provided for the applied voltages in Example 3, only two amplitudes are provided in the present example, where voltages of different amplitudes are applied for odd-numbered subframes and for even-numbered subframes. Thus, the voltage generation circuit and the voltage selector circuit can be simplified.

The subframe periods $T_k$ (μs) and the data signal voltage values $V_k$ (V) for the subframe periods $T_k$ (herein, k=1 to 16) are set in such proportions as shown by the following Expressions 18 and 19, respectively.

(Expression 18)

$$T_1:T_2:T_3:T_4:T_5:T_6:T_7:T_8:T_9:T_{10}:T_{11}:T_{12}:T_{13}:T_{14}:T_{15}:T_{16}=1:1:1:1:1:1:1:1:1:1:1:1:1:1:1:1 \tag{18}$$

(Expression 19)

$$V_1:V_2:V_3:V_4:V_5:V_6:V_7:V_8:V_9:V_{10}:V_{11}:V_{12}:V_{13}:V_{14}:V_{15}:V_{16}=5:4:5:4:5:4:5:4:5:4:5:4:5:4:5:4 \tag{19}$$

With the proportional constants shown in Expressions 18 and 19, binary display states $H_k$ (ON) and $L_k$ (OFF) for each frame period $T_k$ can be expressed as Expression 20 below.

(Expression 20)

$$H_1=T_1\times V_1\times 1=5,\ L_1=T_1\times V_1\times 0=0$$

$$H_2=T_2\times V_2\times 1=4,\ L_2=T_2\times V_2\times 0=0$$

$$H_3=T_3\times V_3\times 1=5,\ L_3=T_3\times V_3\times 0=0$$

$$H_4=T_4\times V_4\times 1=4,\ L_4=T_4\times V_4\times 0=0$$

- - -

$$H_{15}=T_{15}\times V_{15}\times 1=5,\ L_{15}=T_{15}\times V_{15}\times 0=0$$

$$H_{16}=T_{16}\times V_{16}\times 1=4,\ L_{16}=T_{16}\times V_{16}\times 0=0 \tag{20}$$

(Expression 21)

$$H_1+H_2+H_3+H_4+H_5+H_6+H_7+H_8+H_9+H_{10}+H_{11}+H_{12}+H_{13}+H_{14}+H_{15}+H_{16}=72$$

$$H_1+H_2+H_3+H_4+H_5+H_6+H_7+H_8+H_9+H_{10}+H_{11}+H_{12}+H_{13}+H_{14}+H_{15}+H_{16}=68$$

$$H_1+H_2+H_3+H_4+H_5+H_6+H_7+H_8+H_9+H_{10}+H_{11}+H_{12}+H_{13}+H_{14}+L_{15}+H_{16}=67$$

- - -

$$L_1+L_2+L_3+L_4+L_5+L_6+L_7+L_8+L_9+L_{10}+L_{11}+L_{12}+L_{13}+L_{14}+H_{15}+L_{16}=5$$

$$L_1+L_2+L_3+L_4+L_5+L_6+L_7+L_8L_9+L_{10}+L_{11}+L_{12}+L_{13}+L_{14}+L_{15}+H_{16}=4$$

$$L_1+L_2+L_3+L_4+L_5+L_6+L_7+L_8+L_9+L_{10}+L_{11}+L_{12}+L_{13}+L_{14}+L_{15}+L_{16}=0 \quad (21)$$

Although some integer values are not available as can be seen from Expression 21, as long as 32 or more integer values are available, there is no problem in effecting 32 gray-scale levels in practice.

Regarding the method for varying the amplitude of applied voltages: the scanning signal voltage value may be fixed while the data signal voltage value is varied; the data signal voltage value may be fixed while the scanning signal voltage value is varied; or it is also applicable to vary both the scanning signal voltage value and the data signal voltage value. Any of these methods can be employed.

According to the present example, the number n of frames for which a gray-scale level is effected on a pixel as the average state of the pixel can be reduced as compared to the conventional techniques. For example, while the scanning signal voltage to a constant value is fixed, the data signal voltage for a respective subframe period $T_k$ can be varied for odd-numbered frames and for even-numbered frames so that 4 gray-scale levels are effected using two frames (n=2). Four gray-scale levels can be effected similarly by fixing the data signal voltage to a constant value, while varying a scanning signal voltage for odd-numbered frames and for even-numbered frames. On the other hand, according to the conventional frame modulation method, only three gray-scale levels can be effected using two frames.

Figure 17:
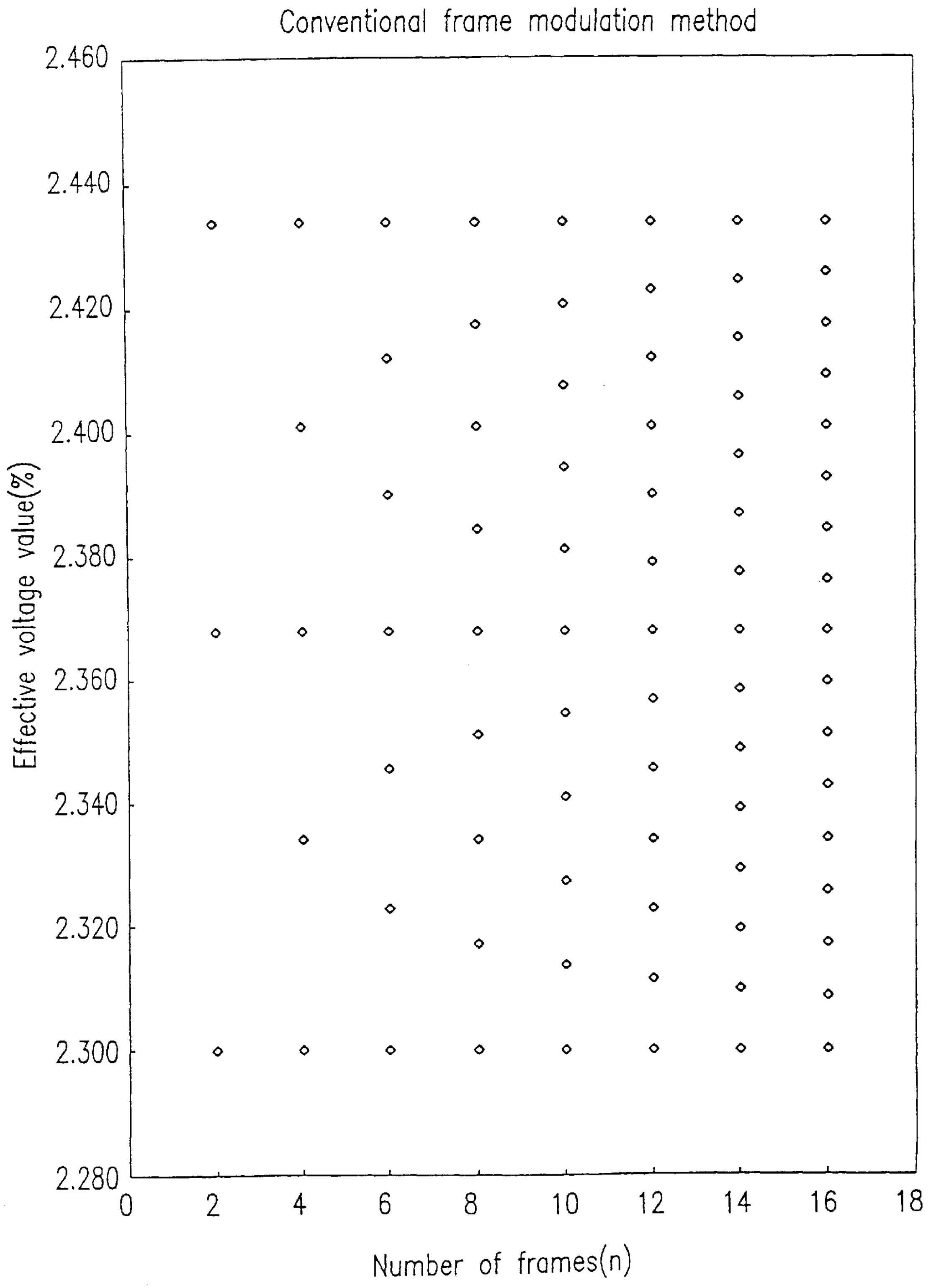
FIG. 17 is a graph illustrating the relationship between the number of frames and the most gray-scale levels for the number of frames in a conventional frame modulation method.

FIG. 17 shows the number of frames to be provided and the most gray-scale levels which can be effected with the number of the provided frames in the conventional frame modulation method. In this figure, the x-axis represents the number n of frames, whereas the y-axis represents the number g of the possible (or maximum) gray-scale levels. According to the conventional frame modulation method, the number g of the possible gray-scale levels is expressed by Expression 22 below.

(Expression 22)

$$g=n+1 \quad (22)$$

Figure 18:
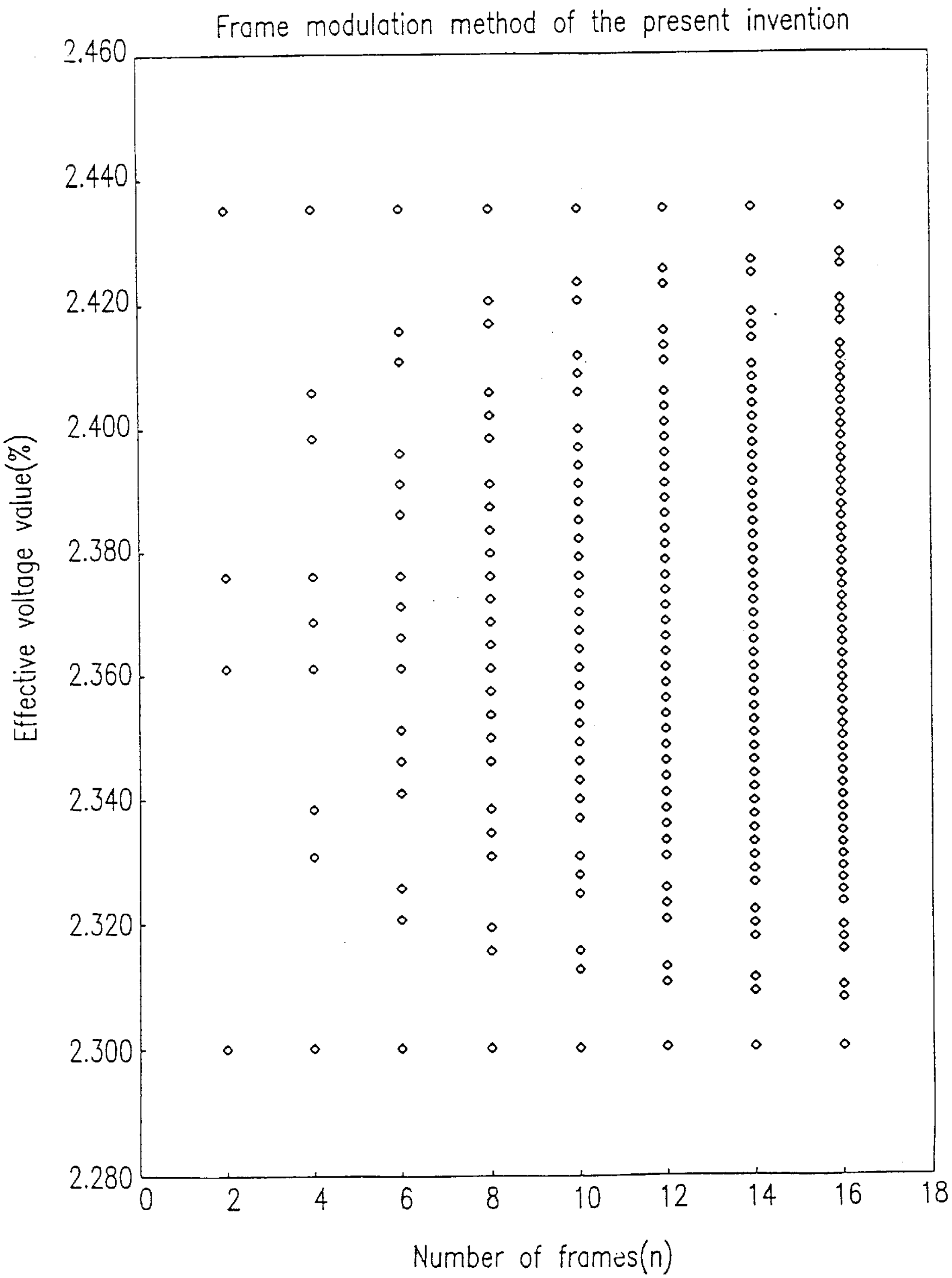
FIG. 18 is a graph illustrating the relationship between the number of frames and the maximum grayscale levels for the number of frames in the case where the present invention is applied to the frame modulation method.

FIG. 18 shows an example of the number of frames to be provided and the number of the possible gray-scale levels which can be effected with the number of frames when the present invention is applied to the frame modulation method. Herein, the amplitude ratio of data signal voltage for odd-numbered frames and that for even-numbered frames is set to 5:4. Also in this figure, the x-axis represents the number n of frames, whereas the y-axis represents the number g of the possible gray-scale levels. It can be seen that, by providing two different voltage amplitudes, the number g of the possible grayscale levels is expressed by Expression 23 below, whereby a greater number of gray-scale levels can be effected as compared to the conventional method using the same number of frames.

(Expression 23)

$$g \leq \frac{n}{2} + 1^2 \quad \left(\text{herein, } \frac{n}{2} \text{ is an integer}\right) \qquad (23)$$

It is apparent that even more gray-scale levels can be effected with the same number of frames when three or more different voltage amplitudes are provided. When number m of different voltage amplitudes are provided, the number g of the possible gray-scale levels is expressed by Expression 24 below.

(Expression 24)

$$g \leq \left(\frac{n}{m} + 1\right)^m \quad \left(\text{herein, } \frac{n}{m} \text{ is an integer}\right) \qquad (24)$$

As described above, according to the liquid crystal display device and the method for driving the same according to Example 4 of the present invention, a gray-scale display can be conducted with a reduced number of frames based on the conventional frame modulation method. As a result, flickers in the displayed images which would occur in the conventional frame modulation method can be suppressed.

For further reducing flickers, a gray-scale display with 32 or more levels can be conducted by employing an area gray-scale method such as the dither method or the error diffusion method in combination with some 8 frames, for example, provided for effecting 16 gray-scale levels.

This can be realized with the circuit scale being comparable to that in the conventional frame modulation method. Thus, it is possible to conduct a gray-scale display while suppressing flickers in the displayed images without increasing the manufacturing cost.

As described above, according to the present invention, for the image display data for one frame, there are provided subframes of a number equal to or greater than the number of bits (the bit length of gray-scale data) representing the gray-scale level for each horizontal period, and a voltage amplitude is set independently for each subframe. According to such a structure, a certain number of gray-scale levels can be effected by using less subframes as compared to-the pulse width modulation method and the frame modulation method. As a result, flickers in the displayed images which would occur in the frame modulation method and the display non-uniformity which would occur in the pulse width modulation method can be suppressed.

Further, image data for one frame is processed as binary display data for each subframe. Therefore, it is possible to eliminate the complicated large-scale arithmetic circuit for performing square-sum calculation and square-root extraction and to eliminate a high-precision liquid crystal driver for outputting the analog voltage amplitudes, which are required in the amplitude modulation method.

Furthermore, by setting a subframe period independently for each subframe, it is possible to suppress the display non-uniformity due to waveform distortion which occurs when the minimum pulse width is reduced as the number of gray-scale levels increases as in the pulse width modulation method.

Furthermore, by setting a voltage amplitude independently for each subframe, it is possible to construct a display device most suitable for the response characteristics of the liquid crystal panel and the voltage endurance of the liquid crystal driver.

Thus, with the method for driving a liquid crystal panel according to the present invention, it is possible to conduct a gray-scale display while suppressing the undesirable effects in the conventional grayscale methods (e.g., flickers in the displayed images which would occur in the frame modulation method and the display non-uniformity which would occur in the pulse width modulation method), without increasing the circuit scale so much as in the amplitude modulation method.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device including a liquid crystal panel, the panel comprising:

a plurality of row electrodes to which scanning signals are applied;

a plurality of column electrodes arranged so as to cross the plurality of row electrodes to which display signals are applied; and a liquid crystal layer interposed between the row electrodes and the column electrodes for displaying images in response to a value of an effective voltage applied between the row electrode and the column electrode at intersections of the row electrodes and the column electrodes, the device comprising:

a display data transformer for receiving input image data for one frame, for providing subframes for a period including a plurality of frames, a number of subframes being equal to d or greater than a number of gray-scale bits representing a gray-scale level of the input image data, and for generating binary display data in which respective binary data is associated with each subframe according to the gray-scale bits;

a pulse amplitude controller for transforming the binary display data by setting a respective voltage amplitude independently for each subframe according to the binary display data so as to generate a display signal having a respective voltage value set independently for each subframe, whereby an effective voltage according to the gray-scale bits of the input image data is applied to the liquid crystal display layer so as to conduct a gray-scale display for the input image data.

2. A liquid crystal display device according to claim 1, wherein each of the subframes is a horizontal scanning period in a corresponding one of the plurality of frames.

3. A method for driving a liquid crystal display device, the device comprising:

a plurality of row electrodes;

a plurality of column electrodes arranged to cross the plurality of row electrodes; and a liquid crystal layer interposed between the row electrodes and the column electrodes for displaying images in response to a value of an effective voltage applied between the row electrode and the column electrode at intersections of the row electrodes and the column electrodes, the method comprising the steps of:

receiving input image data for one frame and, providing subframes for a period including a plurality of frames, a number of the subframes being equal to- or greater than a number of gray-scale bits representing a gray-scale level of the input image data;

generating binary display data in which respective binary data is associated with each subframe according to the gray-scale bits for each subframe;

transforming the binary display data by setting a respective voltage amplitude independently for each subframe according to the binary display data so as to generate a display signal having a respective voltage value set independently for each subframe;

applying the scanning signal to the corresponding row electrode; and applying the display signal to the plurality of column electrodes in synchronization with the application of the corresponding scanning signal, whereby effective voltages according to the gray-scale bits of the input image data are applied to the liquid crystal display layer so as to conduct a gray-scale display for the input image data.

4. A method for driving a liquid crystal display device according to claim 3, wherein each of the subframes is a horizontal scanning period in a corresponding one of the plurality of frames.

5. A liquid crystal display device including a liquid crystal panel including:

a plurality of row electrodes;

a plurality of column electrodes arranged so as to cross the plurality of row electrodes; and a liquid crystal layer interposed between the row electrodes and the column electrodes for displaying images in response to a value of an effective voltage applied between the row electrode and the column electrode at intersections of the row electrodes and the column electrodes, the device comprising:

a display data transformer for receiving input image data for one frame, for dividing a selection period for each row electrode in the frame into subframes of a number equal to or greater than a number of gray-scale bits representing a gray-scale level of the input image data, the scanning signal being applied to the row electrode during the corresponding selection period, and for generating binary display data in which respective binary data is associated with each subframe according to the gray-scale bits;

a pulse width controller for controlling the division of the selection period in the display data transformer and for setting a respective subframe period independently for each subframe;

an orthogonal transformer for performing an orthogonal transformation for the binary display data using a predetermined orthogonal matrix to generate transformed display data;

a pulse amplitude controller for transforming the transformed display data by setting a respective voltage amplitude independently for each subframe according to the transformed display data so as to generate display signals each having a respective voltage value set independently for each subframe;

a column driver for applying the display signals to the plurality of column electrodes;

means for generating scanning signals based on the orthogonal matrix; and a row driver for simultaneously selecting at least a predetermined number of the row electrodes out of the plurality of row electrodes and applying the scanning signals to the predetermined number of row electrodes, whereby an inverse transformation of the orthogonal transformation is performed on the liquid crystal panel, so that effective voltages according to the gray-scale bits of the input image data are applied to the liquid crystal display layer so as to conduct a gray-scale display for the input image data.

6. A method for driving a liquid crystal display device, the device comprising:

a plurality of row electrodes;

a plurality of column electrodes arranged so as to cross the plurality of row electrodes; and a liquid crystal layer interposed between the row electrodes and the column electrodes for displaying images in response to a value of an effective voltage applied between the row electrode and the column electrode at intersections of the row electrodes and the column electrodes, the method comprising the steps of:

dividing a selection period for each row electrode in one frame of input image data into subframes of a number equal to or greater than a number of gray-scale bits representing a gray-scale level of the input image data, a scanning signal being applied to the respective row electrode during the selection period;

controlling dividing widths for the selection period and for setting a respective subframe period independently for each subframe;

generating binary display data in which respective binary data is associated with each subframe according to the gray-scale bits;

performing an orthogonal transformation for the binary display data using a predetermined orthogonal matrix so as to generate transformed display data;

transforming the transformed display data by setting a respective voltage amplitude independently for each subframe according to the transformed display data so as to generate display signals each having a respective voltage value set independently for each subframe;

generating scanning signals based on the orthogonal matrix;

simultaneously selecting at least a predetermined number of the row electrodes out of the plurality of row electrodes and applying the scanning signals to the predetermined number of row electrodes; and applying the display signals to a plurality of column electrodes in synchronization with the application of the scanning signals, whereby an inverse transformation of the orthogonal transformation is performed on the liquid crystal panel, so that effective voltages according to the gray-scale bits of the input image data are applied to the liquid crystal display layer so as to conduct a gray-scale display for the input image data.

* * * * *